(12) United States Patent
Yamaguchi

(10) Patent No.: US 9,940,561 B2
(45) Date of Patent: Apr. 10, 2018

(54) CONTROL METHOD OF AN IMAGE FORMING APPARATUS THAT PREVENTS PAPER TYPE DIFFERENCES WHEN RESUMING A PRINT JOB ON A SECOND IMAGE FORMING APPARATUS

(71) Applicant: KYOCERA Document Solutions Inc., Osaka (JP)

(72) Inventor: Hirofumi Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 131 days.

(21) Appl. No.: 15/011,524

(22) Filed: Jan. 30, 2016

(65) Prior Publication Data

US 2016/0224875 A1    Aug. 4, 2016

(30) Foreign Application Priority Data

Jan. 30, 2015    (JP) .................. 2015-017738

(51) Int. Cl.
*G06K 15/00* (2006.01)
*H04N 1/00* (2006.01)
*G06K 15/16* (2006.01)

(52) U.S. Cl.
CPC ......... *G06K 15/4005* (2013.01); *G06K 15/16* (2013.01); *H04N 1/0032* (2013.01);
(Continued)

(58) Field of Classification Search
CPC ............................................... G06K 15/4005
See application file for complete search history.

(56) References Cited

U.S. PATENT DOCUMENTS

2004/0190042 A1* 9/2004 Ferlitsch ............ H04N 1/00233
358/1.15
2006/0044593 A1* 3/2006 Kawakami ............ G06F 3/1207
358/1.14
(Continued)

FOREIGN PATENT DOCUMENTS

JP    2001-333249 A    11/2001
JP    2002-193465 A    7/2002
(Continued)

*Primary Examiner* — Benjamin O Dulaney
(74) *Attorney, Agent, or Firm* — Hawaii Patent Services; Nathaniel K. Fedde; Kenton N. Fedde

(57) ABSTRACT

Providing is a control method of the image forming apparatus that can prevent, when interrupting a printing process and resuming a printing process by supplying a print sheet or switching to other apparatus, not intending to mix the paper having quality of paper is different in the bundle of the printed documents in advance. It is the control method of the image forming apparatus that interrupts a printing process for a first image forming apparatus and resumes a printing process with the second image forming apparatus. The interruption step of recording interruption information including the specification information of the print sheet at the time of a printing process being interrupted for a first image forming apparatus. It has the resumption step of resuming the printing process in the second image forming apparatus based on interruption information including the specification information of the print sheet.

14 Claims, 25 Drawing Sheets

(52) U.S. Cl.
CPC ..... *H04N 1/00204* (2013.01); *H04N 1/00347* (2013.01); *H04N 2201/0094* (2013.01)

(56) References Cited

U.S. PATENT DOCUMENTS

| | | | |
|---|---|---|---|
| 2007/0024895 A1* | 2/2007 | Clark | G06F 3/1204 358/1.15 |
| 2008/0247767 A1* | 10/2008 | Scrafford | G06F 11/0733 399/8 |
| 2009/0279121 A1* | 11/2009 | Bostick | G06F 3/1212 358/1.15 |
| 2015/0036166 A1* | 2/2015 | Kadota | H04N 1/0009 358/1.14 |

FOREIGN PATENT DOCUMENTS

| | | |
|---|---|---|
| JP | 2004-318432 A | 11/2004 |
| JP | 2010-069652 A | 4/2010 |
| JP | 2010-228198 A | 10/2010 |
| JP | 2011-060071 A | 3/2011 |

\* cited by examiner

FIG.4

| LOGICAL ADDRESS (AREA) | 113: MEMORY PART | | | | | | | | |
|---|---|---|---|---|---|---|---|---|---|
| | DATA (CONTENTS) | | | | | | | | |
| x000 ⋮ x009 | PROGRAM AREA (113a) | MAIN PROGRAM (113a-1) | | | | | | | |
| | | INTERRUPTION PROCESS PROGRAM (113a-2) | | | | | | | |
| | | RESUMPTION PREPARATION PROGRAM (113a-3) | | | | | | | |
| | | RESUMPTION PROCESS PROGRAM (113a-4) | | | | | | | |
| | | CHARACTER RECOGNITION (OCR) PROGRAM (113a-5) | | | | | | | |
| | | ⋮ | | | | | | | |
| x010 ⋮ x019 | VARIOUS SETUP INFORMATION AREAS (113b) | | | | | | | | |
| x020 ⋮ ⋮ x029 | PAPER INFORMATION AREA (113c) | CASSETTE POSITION | MODEL NAME | SIZE | GROUND COLOR GRADATION TABLE | | | | |
| | | | | | C | M | Y | | |
| | | SHEET PAPER CASSETTE 161-1 | ☐☐☐☐☐ | A3 | #☐☐ | #☐☐ | #☐☐ | | |
| | | SHEET PAPER CASSETTE 161-2 | ☐☐☐☐☐ | A4 | #☐☐ | #☐☐ | #☐☐ | | |
| | | ⋮ | ⋮ | ⋮ | ⋮ | ⋮ | ⋮ | | |
| | PRESET AREA (113c-1) | | ☐☐☐☐☐ | A3 | #☐☐ | #☐☐ | #☐☐ | | |
| | | | ☐☐☐☐☐ | A4 | #☐☐ | #☐☐ | #☐☐ | | |
| | | | ⋮ | ⋮ | ⋮ | ⋮ | ⋮ | | |
| x030 ⋮ x039 | INTERRUPTION INFORMATION AREA (113d) | FILE NAME (113d-1) | PLACE | ALL NUMBER OF PAGES | REQUEST NUMBER OF PAGES | REQUEST NUMBER OF COPIES | REMAINING NUMBER OF PAGES (113d-2) | REMAINING NUMBER OF COPIES (113d-3) | BACKGROUND COLOR |
| | | | | | | | | | C M Y |
| | | present | \\user\ | 125 | ALL | 10 | 35 | 2 | ☐☐ ☐☐ ☐☐ |
| | | document | \\server\ | 150 | ALL | 2 | 70 | 1 | ☐☐ ☐☐ ☐☐ |
| | | ⋮ | ⋮ | ⋮ | ⋮ | ⋮ | ⋮ | ⋮ | ⋮ |
| x040 ⋮ ⋮ x049 | CONVERT-COLOR AREA (113e) | RGB:FF0000h | ⋯ | RGB:000000h | | | | | |
| | | CMY:00FFFFh | ⋯ | CMY:FFFFFFh | | | | | |
| | | RGB:00FF00h | ⋯ | RGB:000000h | | | | | |
| | | CMY:FF00FFh | ⋯ | CMY:FFFFFFh | | | | | |
| | | ⋮ | ⋮ | ⋮ | | | | | |
| | | RGB:FF0000h | ⋯ | RGB:000000h | | | | | |
| | | CMY:00FFFFh | ⋯ | CMY:FFFFFFh | | | | | |
| | | RGB:0000FFh | ⋯ | RGB:000000h | | | | | |
| | | CMY:FFFF00h | ⋯ | CMY:FFFFFFh | | | | | |
| x050 ⋮ x059 | IMAGE DATA AREA (113f) | | | | | | | | |
| x060 ⋮ | ⋮ | | | | | | | | |

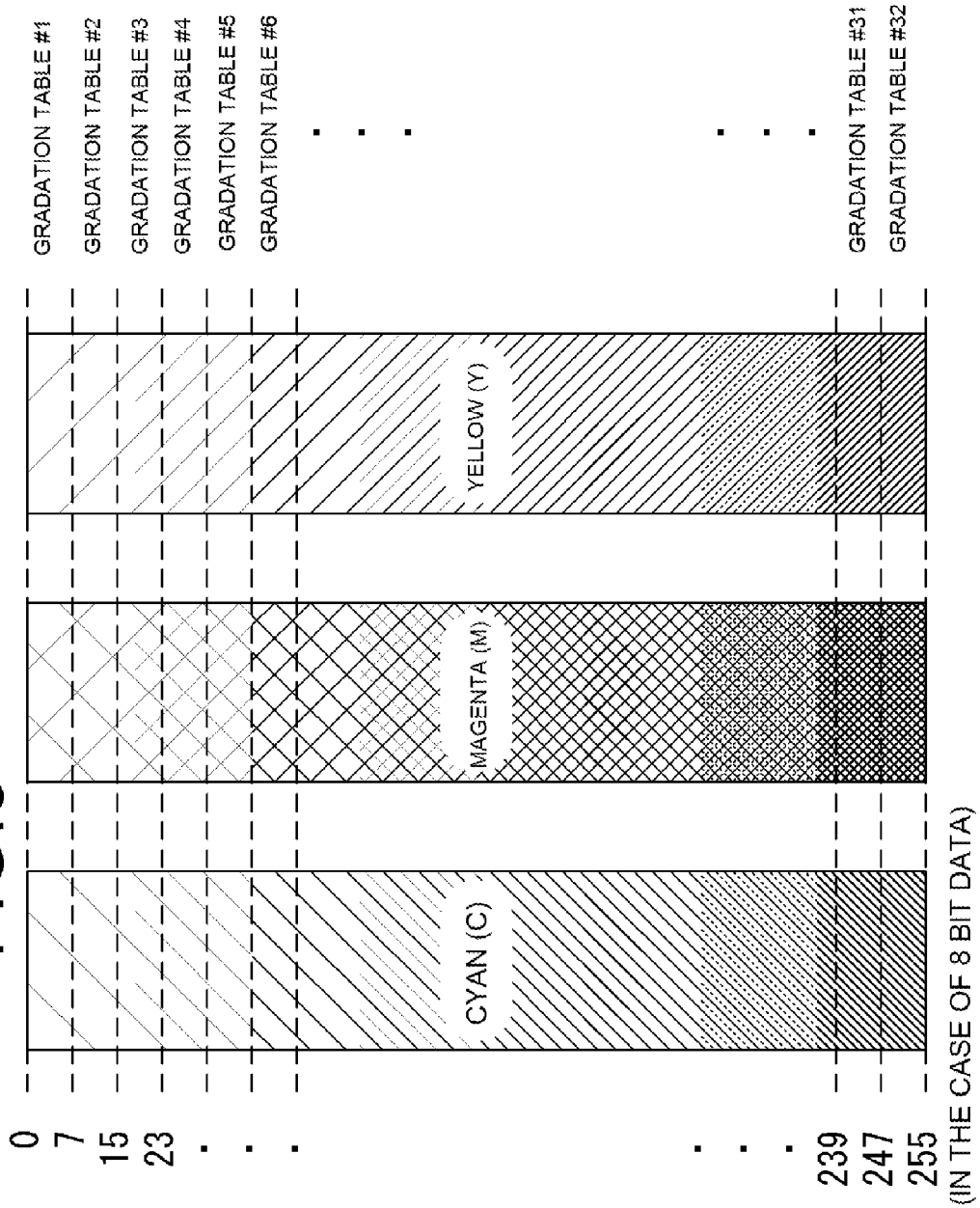

FIG.20

| LOGICAL ADDRESS (AREA) | 113: MEMORY PART ||||||||||
|---|---|---|---|---|---|---|---|---|---|---|
| | DATA (CONTENTS) ||||||||||
| x 0 0 0 ⋮ x 0 0 9 | PROGRAM AREA (113a) | MAIN PROGRAM (113a-1) |||||||||
| | | INTERRUPTION PROCESS PROGRAM (113a-2) |||||||||
| | | RESUMPTION PREPARATION PROGRAM (113a-3) |||||||||
| | | RESTART PROCEDURE PROGRAM (113a-4) |||||||||
| | | ⋮ |||||||||
| x 0 1 0 ⋮ x 0 1 9 | VARIOUS SETUP INFORMATION AREAS (113b) ||||||||||
| x 0 2 0 ⋮ ⋮ x 0 2 9 | PAPER INFORMATION AREA (113c) | | CASSETTE POSITION | MODEL NAME | SIZE | GROUND COLOR GRADATION TABLE |||||
| | | | | | | C | M | Y |||
| | | | SHEET PAPER CASSETTE 161-1 | ☐☐☐☐☐ | A3 | #☐☐ | #☐☐ | #☐☐ |||
| | | | SHEET PAPER CASSETTE 161-2 | ☐☐☐☐☐ | A4 | #☐☐ | #☐☐ | #☐☐ |||
| | | | ⋮ | ⋮ | ⋮ | ⋮ | ⋮ | ⋮ |||
| | | PRESET AREA (113c-1) | | ☐☐☐☐☐ | A3 | #☐☐ | #☐☐ | #☐☐ |||
| | | | | ☐☐☐☐☐ | A4 | #☐☐ | #☐☐ | #☐☐ |||
| | | | | ⋮ | ⋮ | ⋮ | ⋮ | ⋮ |||
| x 0 3 0 ⋮ x 0 3 9 | INTERRUPTION INFORMATION AREA (113d) | FILE NAME (113d-1) | PLACE | ALL NUMBER OF PAGES | REQUEST NUMBER OF PAGES | REQUEST NUMBER OF COPIES | REMAINING NUMBER OF PAGES (113d-2) | REMAINING NUMBER OF COPIES (113d-3) | BACKGROUND COLOR |||
| | | | | | | | | | C | M | Y |
| | | present | \\user\t | 125 | ALL | 10 | 35 | 2 | #☐ | #☐ | #☐ |
| | | document | \\server\ | 150 | ALL | 2 | 70 | 1 | #☐ | #☐ | #☐ |
| | | ⋮ | ⋮ | ⋮ | ⋮ | ⋮ | ⋮ | ⋮ | ⋮ |||
| x 0 4 0 ⋮ x 0 4 9 | IMAGE DATA AREA (113f) ||||||||||
| x 0 5 0 ⋮ | ⋮ ||||||||||

CONTROL METHOD OF AN IMAGE
FORMING APPARATUS THAT PREVENTS
PAPER TYPE DIFFERENCES WHEN
RESUMING A PRINT JOB ON A SECOND
IMAGE FORMING APPARATUS

INCORPORATION BY REFERENCE

This application is based on and claims the benefit of priority from Japanese Patent Application No. 2015-017738 filed on Jan. 30, 2015, the contents of which are hereby incorporated by reference.

BACKGROUND

The present disclosure is related with a control method of an image forming apparatus, and especially, it is related with the control method of the image forming apparatus that can resume printing from an interrupted part after interrupting to print two or more sheets of paper or printing two or more copies.

For example, it is not rare that the organizer of a meeting or a school prints and distributes a lot of materials by using his or her owned printer or copy machine. These materials are materials distributed to an attendant at a meeting in the company, materials distributed to a participant at a small-scale school, or the like. Also, a mobile terminal and a portable printer are popularized. The mobile terminals are a notebook computer, a tablet terminal, or the like. Also, the printer installed in the mobile is also present. Accompanied with this, printing also becomes possible during the meeting or moving to the school. However, the printing process is interrupted if the printing process is not completed during the movement. This is because of switching over the printing process to another apparatus at the destination.

Now, introduction of the MFP is also increased in the printer of the general purpose, which is not a business-use for not such printing specialty. The MFP has a plurality of processing capabilities, such as not only a print function but a scanner function, a copy function, a facsimile function, or the like. Also, even if it is not the MFP, in the printer connected with the network, process requests of printing, or the like, may be accomplished, almost simultaneously, from a plurality of users in a short time.

For such an apparatus, even if it occupies the apparatus over a long time by printing of a lot of materials, or the like, and in case that there are other process requests with a high priority, printing of the lot of materials, or the like, may be interrupted, temporarily. In this case, printing is resumed after the process that has a high priority is completed. Or, print sheets may be supplied in the middle with printing of the lot of materials. Moreover, for these, printing may have to be interrupted for a supplement of toner or ink. Further, in the case in order that the supplement of print sheets, toner, ink, or the like, may take time, a printing process may be switched over to the other apparatus.

SUMMARY

A control method of the image forming apparatus the present disclosure is the control method of the image forming apparatus that interrupts a printing process for a first image forming apparatus and resumes the printing process with the second image forming apparatus. It has the interruption step of recording interruption information including specification information of a print sheet at the time of the printing process being interrupted for the first image forming apparatus. Also, it has the resumption step of resuming the printing process in the second image forming apparatus based on interruption information including the specification information of the print sheet.

BRIEF DESCRIPTION OF THE DRAWINGS

FIG. 4 is a figure (memory map) explaining contents of memory part 113 in each embodiment in the present disclosure;

FIG. 5 is a figure (chart) explaining a gradation table used in each embodiment in the present disclosure;

FIG. 20 is a figure (memory map) explaining contents of memory part 113 according to a modification of the embodiment in the present disclosure;

DETAILED DESCRIPTION

Figure 1:
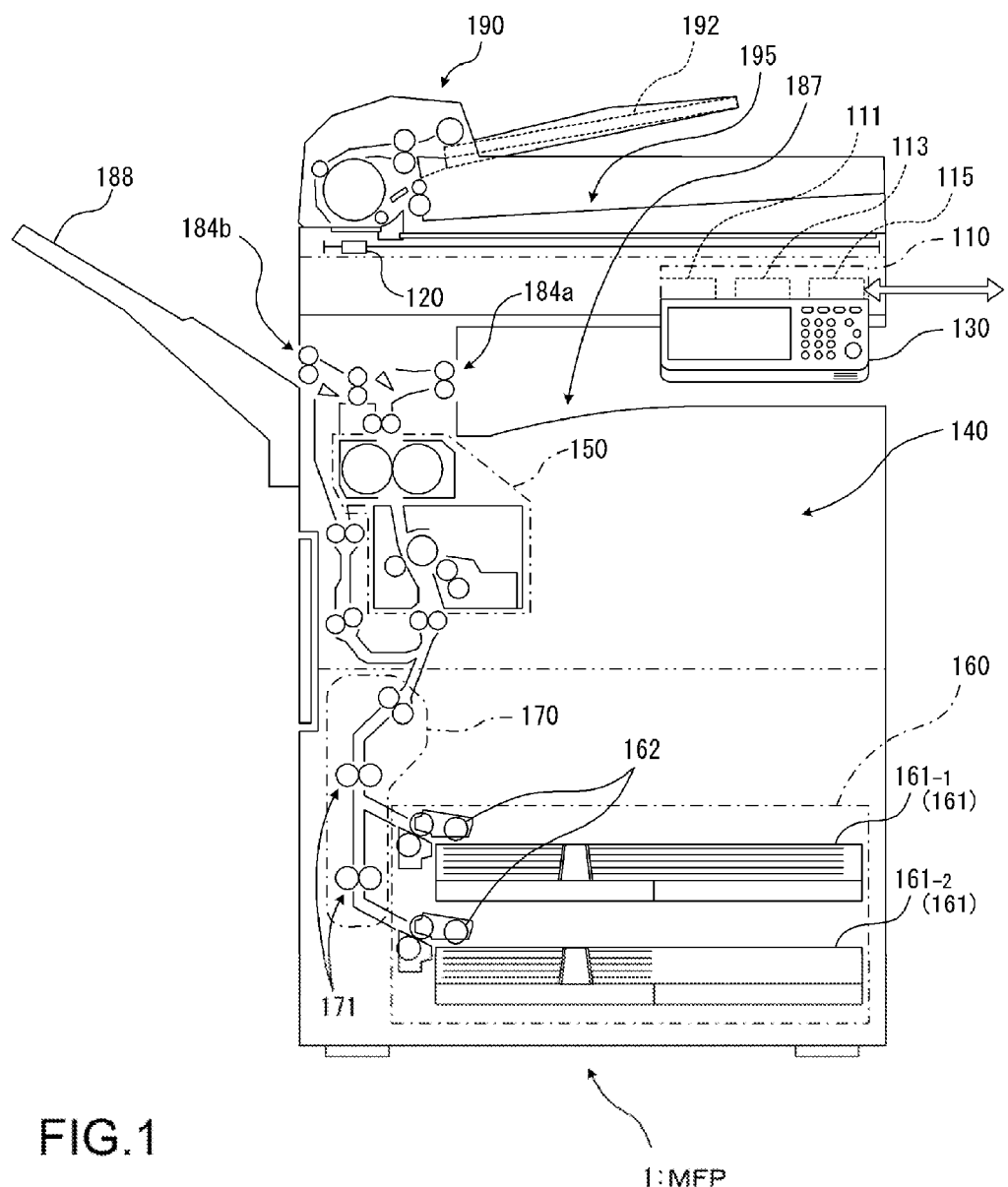
FIG. 1 is a figure showing an example of an internal entire configuration of MFP 1 according to each embodiment in the present disclosure.

Then, an embodiment in the present disclosure is explained in detail with reference to drawings. In FIG. 1, an entire configuration of MFP (Multi-Function Peripherals) 1 that is an MFP applied to an embodiment in the present disclosure is shown. Also, in FIG. 2, an example of a configuration of the control system in MFP 1 is shown. In addition, in the present embodiment, a part that is not distinctive in the present disclosure, about a part that has little relationship with the distinctive part, or a part that has a general configuration, addition of the numerals in a drawing and its detailed explanation may not be shown.

Figure 2:
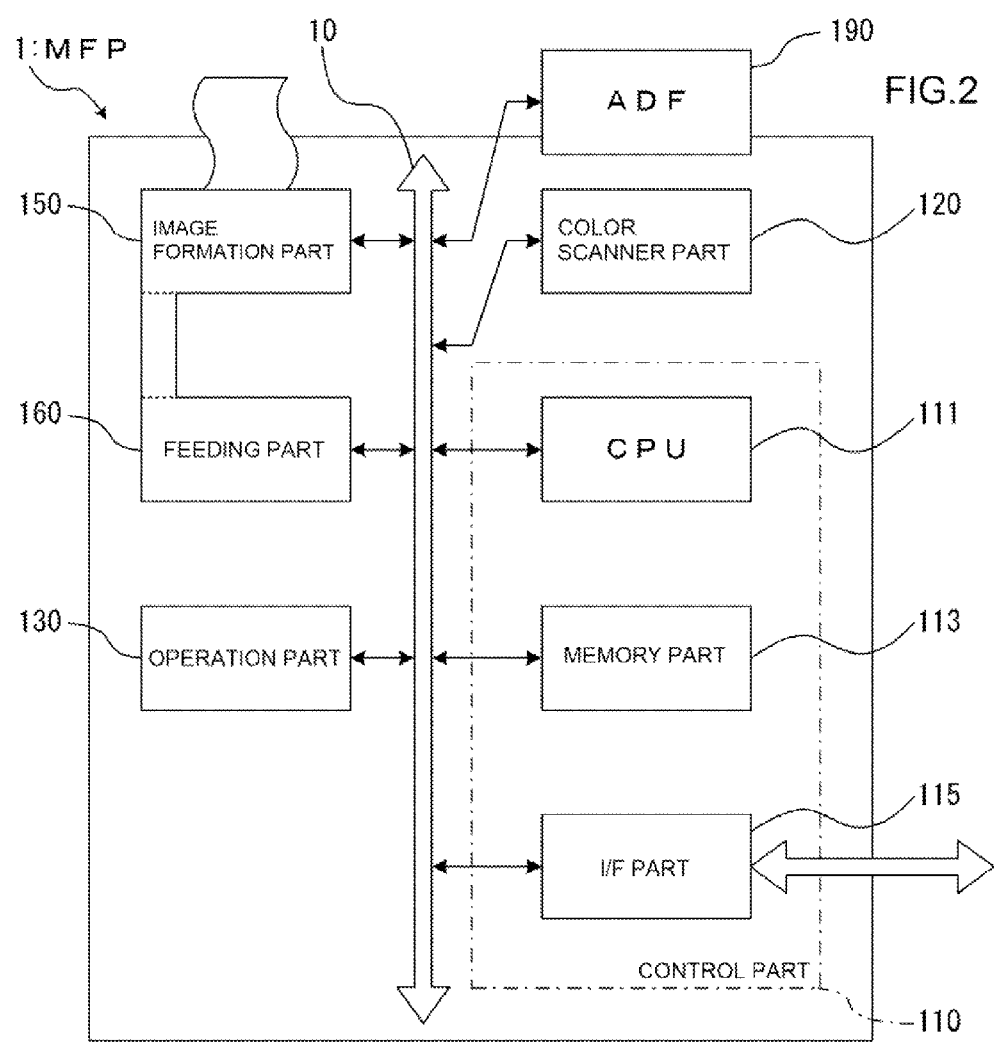
FIG. 2 is a figure showing an example of a configuration of a control system of MFP 1 in each embodiment in the present disclosure.

As refer to FIG. 1 and FIG. 2, MFP 1 includes control part 110, color scanner part 120, operation part 130, image formation part 150, feeding part 160, and an ADF (Auto Document Feeder) 190, or the like. Each part is connected with bus 10 and is controlled by control part 110.

Above-mentioned each part is explained in detail. Color scanner part 120 is configured as including CCD (Charge Coupled Device) image sensors, an exposure lamp, a light emitting diode, or the like. Color scanner part 120 is provided in the upper part of MFP 1. ADF 190 is further placed in the upper part of it.

ADF 190 feeds out a manuscript placed on manuscript tray 192. In this case, when bundle of the manuscript having two or more sheets is placed, ADF 190 feeds out one sheet at a time. In the situation, ADF 190 conveys the manuscript to an upper surface of above-mentioned color scanner part 120. Then, ADF 190 makes the upper surface side pass in order that the reading object side of the manuscript is faced to color scanner part 120. Subsequently, ADF 190 discharges this manuscript to discharging tray 195.

Figure 3:
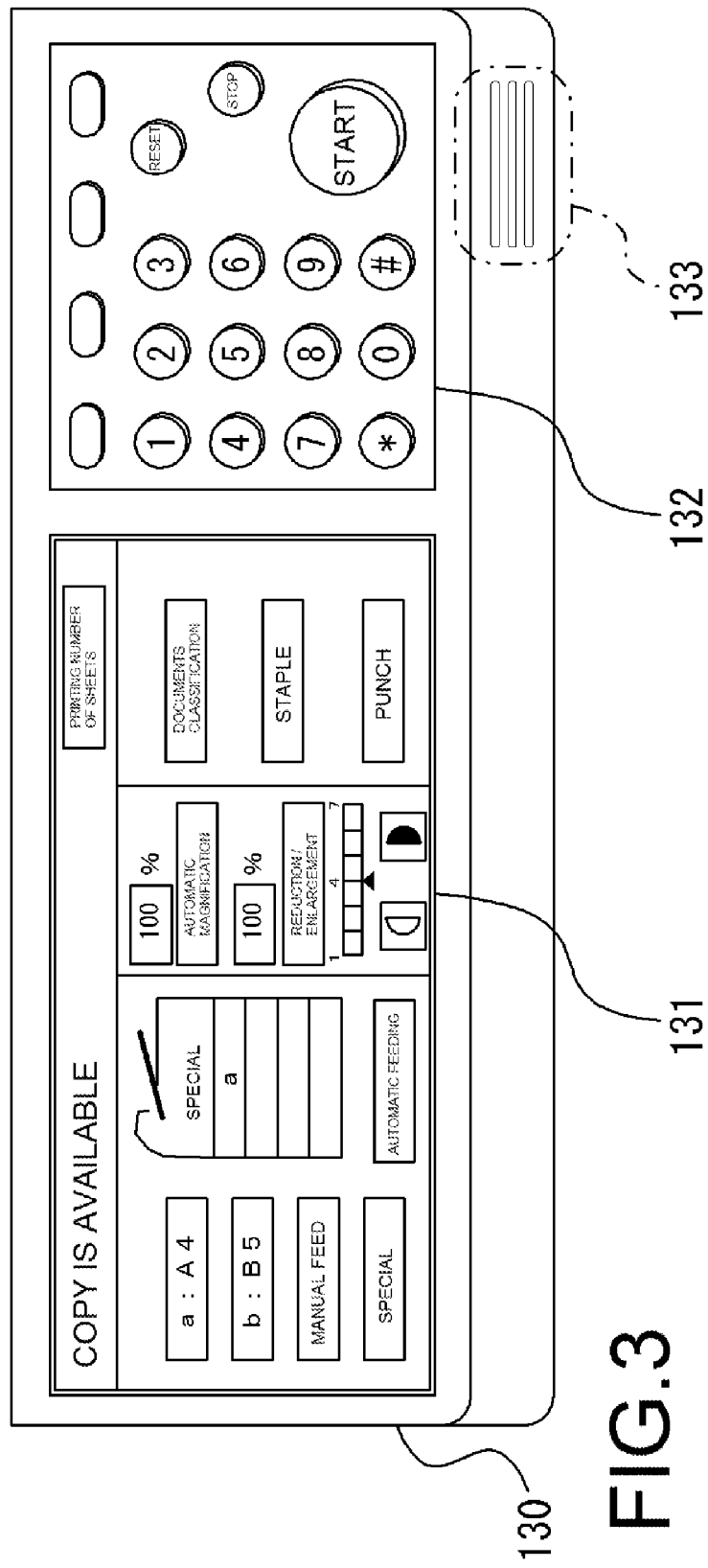
FIG. 3 is a figure showing an example of operation part 130 provided in MFP 1 in each embodiment in the present disclosure.

Operation part 130 that performs a setup and instructions of operation for MFP 1 is provided in the front side of MFP 1. As refer to FIG. 3, operation part 130 is configured with set display 131, keyboard 132, sound annunciator 133, or the like. Display for indication 131 is provided with the transparent touch panel on the surface of the liquid crystal display panel. Keyboard 132 inputs a numerical value of printing number of sheets, or the like. Sound annunciator 133 is a speaker, or the like, for reporting an acoustic signal or a voice message.

The middle part of MFP 1 is printing part 140. In printing part 140, image formation part 150 having an optical part, a fixing part, or the like, is provided. The lower part of MFP 1 is feeding part 160 provided with a plurality of sheet paper cassettes 161-1 and 161-2 (hereinafter, it is only called "sheet paper cassette 161" if needed) that contain print sheets, or the like. Between feeding part 160 and image formation part 150, carrying path 170 having conveying roller pairs 171, 171—is formed. By conveying roller pairs 171, 171 —, a print sheet, or the like, is conveyed. This print sheet, or the like, is fed out one sheet at a time from sheet paper cassette 161 with delivery roller 162.

The print sheet, or the like, which is fed out one sheet at a time from sheet paper cassette 161 with delivery roller 162, is conveyed to image formation part 150 by conveying roller pairs 171, 171 —. The print sheet formed the image by image formation part 150 is discharged from discharge opening 184a to discharging tray 187. Or, the print sheet is discharged from discharge opening 184b to discharging tray 188, which is provided in the side part of MPF 1, or the like.

In the upper part of MFP 1, it has control part 110 and, in control part 110, it has CPU (Central Processing Unit) 111, memory part 113, and the I/F (Interface) part 115, or the like. I/F part 115 is a parallel interface, USB (Universal Serial Bus), a LAN (Local Area Network) interface, or the like. I/F part 115 is configured with various interface circuitries that communicate various data between MFP 1, an external electronic terminal, and a recording medium (each of them is described later).

Memory part 113 is a non-transitory recording medium and is configured with a hard disk drive or a semiconductor memory device, such as RAM (Random Access Memory), ROM (Read Only Memory), and a flash memory. The flash memory is a kind of an electrically-rewritable semiconductor memory device. In the memory part 113, a program for control part 110 being to work is written. Otherwise, various data, which is related to a configuration of MFP 1 for each part or printing, or an image data is written in memory part 113. Then, in the present embodiment, information about paper quality and specification of a print sheet is written in memory part 113.

In FIG. 4, a relationship between address and data in memory part 113 are shown. The logical address is shown in FIG. 4, and it explains existence and positional relationship for each area. Therefore, for example, as shown in number of bytes, the size of the data in the address for one unit may be changed with contents. Also, as seen in the physical address, a set of data may be distributed in a plurality of not-continuous physical address areas. The set of data is an image data for one page, for example.

In memory part 113, it is provided that program area 113a in logical addresses x000-x009, various setup information areas 113b in logical addresses x010-x019, paper information area 113c (paper information storage area) in logical addresses x020-x029, interruption information area 113d in logical addresses x030-x039, convert-color area 113e in logical addresses x040-x049, and image data area 113f in logical addresses x050-x059. In FIG. 4, after image data area 113f (logical address x060 or subsequent) is an area of another role, and the explanation is omitted.

Main program 113a-1 for MFP 1 to work is written in above-mentioned program area 113a. In addition, in program area 113a, interruption process program 113a-2, resumption preparation program 113a-3, resumption process program 113a-4, character recognition (Optical Character Recognition) program 113a-5, or the like, as described later, are written. In various setup information areas 113b, service condition of this MFP 1 is written. The service condition is for an installation area, a FAX number, a size of contained recording paper, and a back light setup of operation part 130, or the like.

In the present embodiment, it is necessary to grasp paper quality, specification, or the like, for print sheets contained in each sheet paper cassette 161 —. Therefore, a model name or size, a gradation table (color information) of a ground color as described later, or the like, for the print sheet contained in each sheet paper cassette 161-1 and 161-2 —, are stored on paper information area 113c. The model name of the print sheet is stored if the model name is given to the print sheet. Also, in preset area 113c-1 of paper information area 113c, about a print sheet used as recommended to this MFP 1 or a print sheet generally used in many cases, some pre-set model names and specifications are written.

In the present embodiment, at time of loading sheet paper cassette 161—placed the print sheet with MFP 1, for example, the model name of this print sheet is inputted from operation part 130. Or, when the model name effective in the print sheet is not attached, the size of this print sheet and, this print sheet being bleaching paper or unbleached paper, a colored wood free paper, a Kraft paper, or a recycled paper, is inputted from operation part 130. Also, in the case of recycled paper, the combination rate of used paper is inputted from operation part 130. CPU 111 selects, based on the type of the model name and print sheet inputted from operation part 130, a gradation table, specification, or the like, which are determined to be the most suitable from preset area 113c-1. CPU 111 writes it in a corresponding column of sheet paper cassette 161-1, 161-2 —, in paper information area 113c.

Also, according to the present embodiment, when resuming interrupted printing, the following information needs to be prepared for the inputted data. It is the information about the number of pages that resumes printing, the number of copies printed after resumption, and the ground color of the print sheet being used in the time of interruption. Therefore, in interruption information area 113d, a plurality of interruption information can be recorded about a set of interruption information shown below. The set of these interruption information is file name (or data name) 113d given to data, a place where the data of this file name is stored, all the number of pages, the number of pages of the printing object, number of copies that should be printed, remaining number of pages 113d-2, remaining number of copies 113d-3, and background color, or the like. Among these, the number of pages of the printing object and the number of copies that should be printed are the values as in the printing request, respectively. Also, remaining number of pages 113d-2 is the number of pages that should be printed after resumption of printing. Also, remaining number of copies 113d-3 is number of copies that should be printed after resumption of printing. The background color is a gradation table of the ground color of the print sheet used at the time of the printing interruption. In addition, acquisition and record process of this interruption information are described later.

Convert-color area 113e is an area that records the information for converting RGB data read by color scanner part 120 or RGB data inputted from outside via I/F part 115 into CMY data to form an image in a print sheet by image formation part 150. In addition, although there may be CMYK, which is added K meaning black, or more color numbers, it is referred as CMY for convenience.

Generally, when forming a color image in a print sheet, a multiple-gradation image by using artificial color agents, such as CMY toner or ink, is synthesized as similar to above-mentioned ground color of the print sheet. The color in this case is a natural chromatic color. That is, the value of C:M:Y is determined for each of pixels that constitutes the image. For example, if it is C:M:Y=0:0:0, this pixel is white. That is, it is not visible when the ground color is white. Also, if it is C:M:Y=255:255:255, this is the deepest color. That is, it becomes almost black.

On the other hand, when performing optical reading as like color scanner part 120, the tone of the read pixel (point) or a line is expressed by each intensity of R (red) G (green) B (blue). For example, in case that each of R:G:B is read by 256 gradation (0-255), if it is R:G:B=255:0:0, red tone is the strongest. Also, if it is R:G:B=0:255:0, green tone is the strongest. Also, if it is R:G:B=0:0:255, blue tone is the strongest.

Further, if it is R:G:B=0:0:0, this point is the darkest and close to black. If it is R:G:B=255:255:255, this point is the brightest, this point becomes white in case that the exposure lamp or light emitting diode, which emits the reference light, provides a pure white color.

This is based on the following reason:
When expressing a color of a pixel on a print sheet by a plurality of artificial color agents, it becomes subtractive mixture (a subtraction mixed color, subtractive color mixture.) On the other hand, when expressing a color of a pixel on LCD (Liquid Crystal Display) or CRT (Cathode-Ray Tube,) and a point or a line read with the color scanner, it becomes additive mixture (an additive mixed color, additive color mixture.) Here, between CMY of such subtractive mixture and RGB of additive mixture, they has complementary color relationship between C and R, between M and G, and between Y and B. Between a CMY value and an RGB value, complement relationship is formed, naturally. That is, there is relationship as one side is the maximum, another side is the minimum.

However, perfect complementary color relationship is not obtained in fact. This originates in spectral characteristics, arraying positions of artificial color agents, or the like, for the artificial color agent of a toner or ink, or the scintillating material of a light emitting diode. Here, spectral characteristics are sensitivity characteristics for each color. Therefore, about each pixel of the image expressed by RGB, the calculation routine and color conversion table for converting into CMY are stored on convert-color area 113e.

Image data area 113f is an area that converts RGB and CMY in the image data, converts text data into image data, and temporarily-stores the data for each pixel re-arranged for each page of the print sheet.

Here, it explains a gradation table, which is recorded for each sheet paper cassette 161-1, 161-2—in above-mentioned paper information area 113c, in addition, is recorded into each interruption information in interruption information area 113d. In the present embodiment, a ground color of a print sheet is expressed three colors, C (cyan), M (magenta), and Y (yellow), where intensity is different, respectively.

As the chart of FIG. 5 is referred to, as for each of C:M:Y, tone become deep as a numerical value becomes large. Also, in case that each of C:M:Y is 8 bits (0-255), the light-blue tone (cyan) is the strongest if it is C:M:Y=255:0:0, purplish red tone (magenta) is the strongest if it is C:M:Y=0:255:0, and yellow tone is the strongest if it is C:M:Y=0:0:255.

According to the embodiment in the present disclosure, the ground color of the print sheet is read with the color scanner of color scanner part 120. However, RGB value or CMY value do not become the same between the print sheets having the same specification in many cases. This is because the variation in a tone for each print sheet, color tone sensitivity for each color scanner, color separation ability, the difference of the linearity characteristics for the color tone, or the like, becomes causes of error. Therefore, according to the embodiment of the present disclosure, it divides into gradation tables having 32 steps for each of a CMY value. When the scanner reads the color tone with an RGB value, this CMY value is the CMY value after being converted by the calculation routine and the color conversion table recorded on above-mentioned convert-color area 113e. Also, it is set as gradation table #1 having the smallest numerical value and gradation table #32 having the largest numerical value.

Figure 6A:
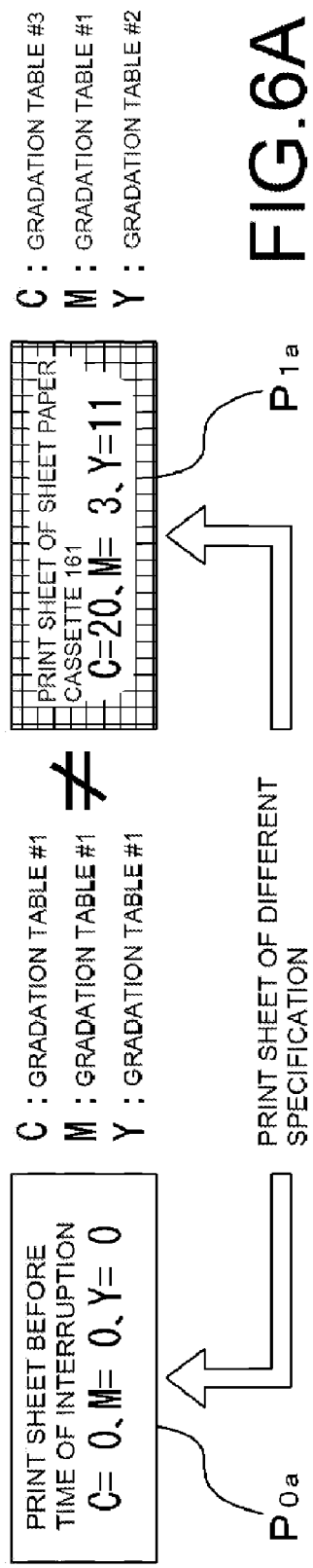
FIG. 6A is a figure showing a situation of the comparison test of specification of a print sheet (color tone) in each embodiment in the present disclosure.
Figure 6B:
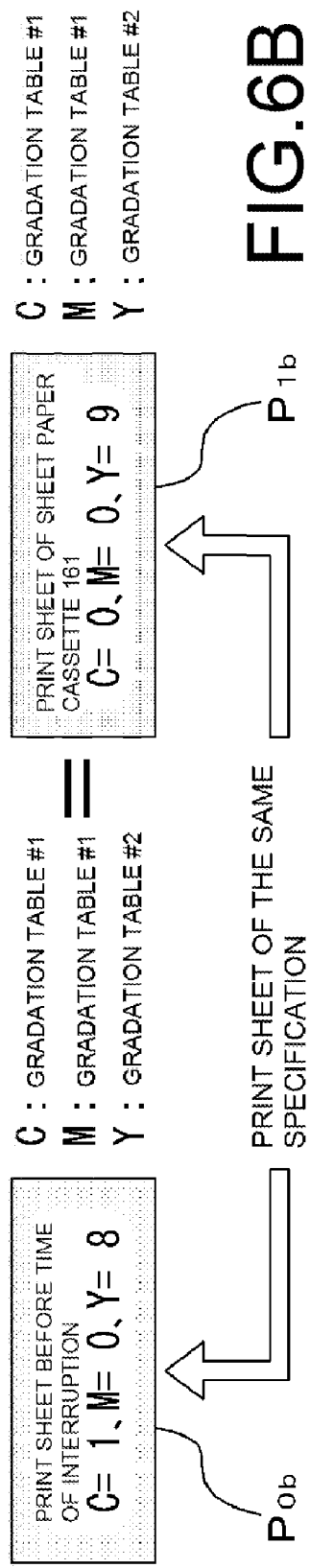
FIG. 6B is a figure showing the situation of the comparison test of the specification of the print sheet (color tone) in each embodiment in the present disclosure.

FIG. 6A and FIG. 6B are referred to. For example, FIG. 6A shows the case where the specification is different between print sheet P0a used until interruption and print sheet P1a contained in sheet paper cassette 161. In this FIG. 6A, the ground color (R:G:B) of print sheet P0a is read by color scanner part 120 that is the color scanner. Then, it converted into the CMY value based on the data recorded on convert-color area 113e. As a result, it is C:M:Y=0:0:0. Also, it means that the color tone of print sheet P1a is C:M:Y=20:3:11. It calculates a gradation table by applying the chart of FIG. 5 for the CMY value of print sheet P0a shown in FIG. 6A and the CMY value of print sheet P1a. Then, it differs from the gradation table of print sheet P0a and the gradation table of print sheet P1a. Therefore, it is determined that the print sheets have different ground colors, mutually.

On the other hand, FIG. 6B shows a case where print sheet P0b used until interruption and print sheet P1b contained by sheet paper cassette 161 have the same specifications. In this FIG. 6B, the ground color (R:G:B) of print sheet P0b is read with the color scanner. Then, it is converted into the CMY value based on the data recorded on convert-color area 113e. As a result, it is C:M:Y=1:0:8. Also, it means the color tone of print sheet P1b is C:M:Y=0:0:9.

In FIG. 6B, print sheet P0b and print sheet P1b have the same specifications. Therefore, the mutual CMY value should also be the same, essentially. However, the difference has happened in the mutual CMY value by the above-mentioned factors. Even in such a case, when it calculates for a gradation table by applying the chart of FIG. 5, the gradation table of print sheet P0b and the gradation table of print sheet P1b become the same. Therefore, it is determined as the print sheet having the same specification.

In the embodiment in the present disclosure, about paper information area 113c, the number of such the gradation table is recorded for each sheet paper cassette 161-1, 161-2 —. Also, in interruption information area 113d, the number of such the gradation table is recorded for each interruption information.

First Embodiment

Figure 7:
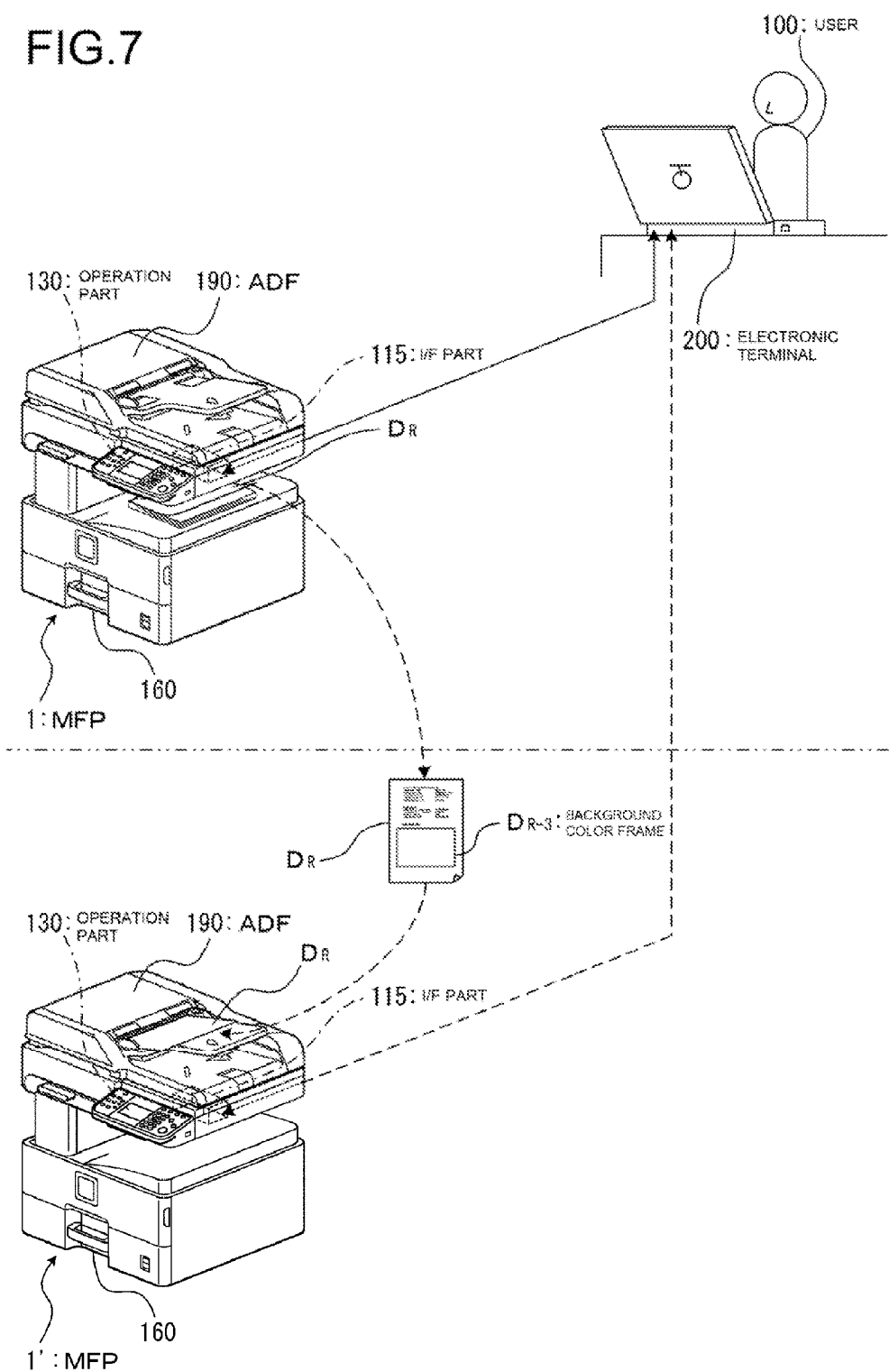
FIG. 7 is a figure showing an entire configuration according to interruption and resumption of a printing process.

As shown in FIG. 7, the first embodiment explains a case as follows. User 100 performs a printing process by using electronic terminal 200 connected with MFP 1 (first image forming apparatus). Electronic terminal 200 is a portable computer, for example. In the middle of this, the printing process is interrupted, unavoidably. Then, electronic terminal 200 is connected to MFP 1' (second image forming apparatus), and the interrupted printing process is resumed. In addition, in each embodiment in the present disclosure, the operator of electronic terminal 200 and the operator of MFP 1, or the like, are generally called as user 100. Also, in FIG. 7, it explains that MFP 1' has the same configuration as MFP 1. MFP 1 and MFP 1' once spools (records) all the inputted print data to image data area 113f, and prints them for each page.

Also, the present embodiment is broadly divided into "interruption process block (1)", "a resumption preparation block (1)", and "resumption process block (1) (restart procedure block (1))."

Hereinafter, for each processing block, the contents of its process are explained. The interruption process block (1) is a process to print, in charge of interrupting the printing process, interruption information, which is recorded on interruption information area 113d in memory part 113 in MFP 1', to interruption information page DR (interruption information image) as described later. Also, the interruption process block (1) is the process in MFP 1 in FIG. 7. Also, the interruption process block (1) is explained as executed by CPU 111 in MFP 1 (Afterwards, it is performed in the same manner.)

Figure 8:
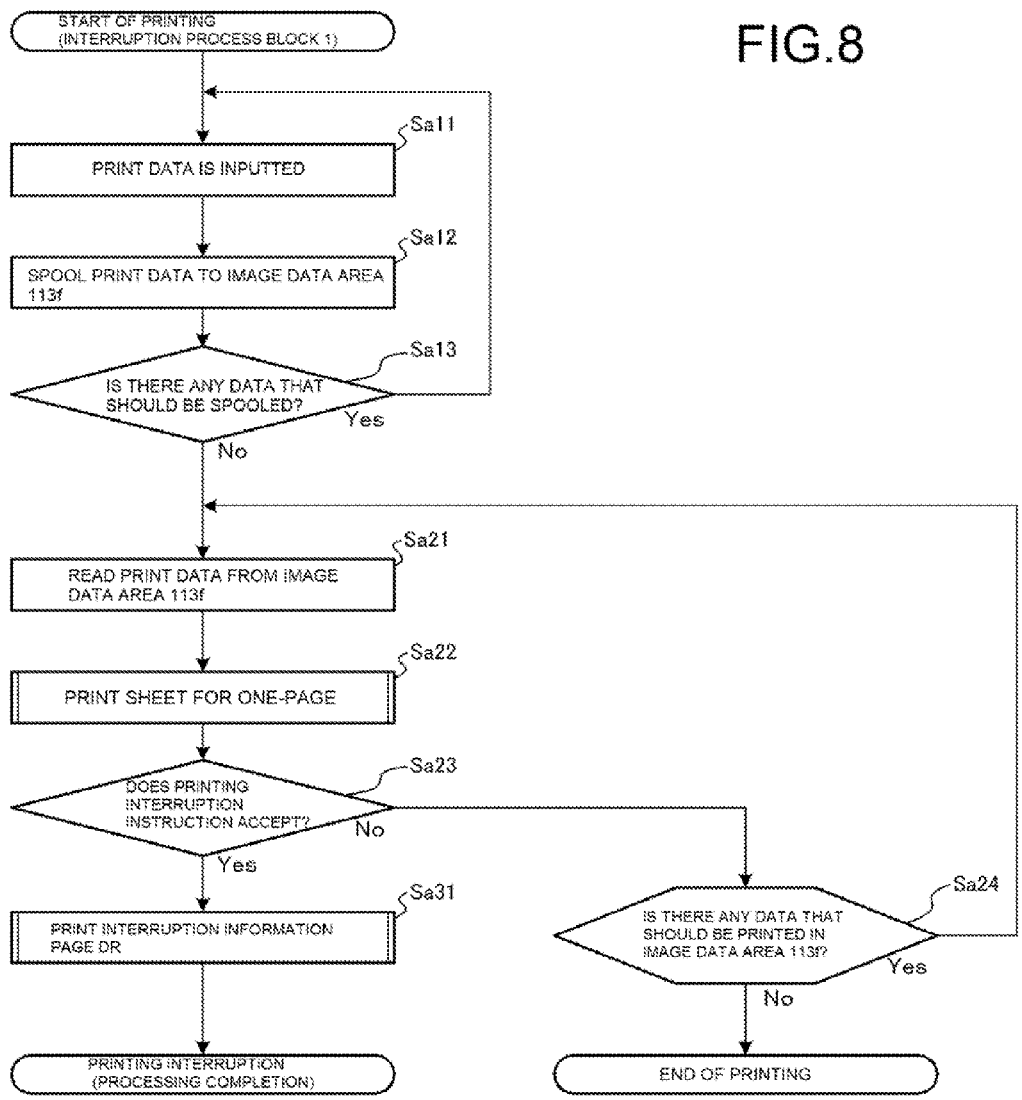
FIG. 8 is a flowchart that shows a flow of the interruption process block (1) according to the first embodiment in the present disclosure.

As FIG. 8 is referred to, firstly, user 100 inputs the print data (image data and text data, in addition to information of a file name, or the like) from electronic terminal 200, or the like, to MFP 1 (step Sa11). If the print data is inputted in step Sa11, MFP 1 spools the inputted print data to image data area 113f (step Sa12). Further, if MFP 1 has the print data that should be spooled (step Sa13), it repeats from the process of step Sa11.

If there is no print data that should be spooled in step Sa13, MFP 1 reads the print data for one page from image data area 113f (step Sa21). Then, one-page for the print sheet is printed by image formation part 150 (step Sa22). In this step Sa22, from one of sheet paper cassette 161-1, 161-2 — instructed from electronic terminal 200 or operation part 130, one sheet of the print sheet is fed out. MFP 1 forms the image based on the print data read from image data area 113f in the print sheet by image formation part 150.

After printing for one page, MFP 1 checks whether or not printing interruption are instructed from electronic terminal 200 or operation part 130 (step Sa23). If it does not have the instruction, MFP 1 further checks whether or not the data that should be printed remains in image data area 113f (step Sa24).

If it is determined in step Sa24 that the data that should be printed remains in image data area 113f, it returns to step Sa21, and then one page of the print data that should be printed are read from image data area 113f. If the data that should be printed does not remain in image data area 113f in step Sa24, printing is ended.

In above-mentioned step Sa23, if there are instructions of printing interruption from electronic terminal 200 or operation part 130, one of the print sheet is further fed out from one of the sheet paper cassette 161-1 161-2—that fed out the print sheet just before that. Then, interruption information page DR that arranges interruption information is formed to this print sheet (step Sa31).

Figure 9:
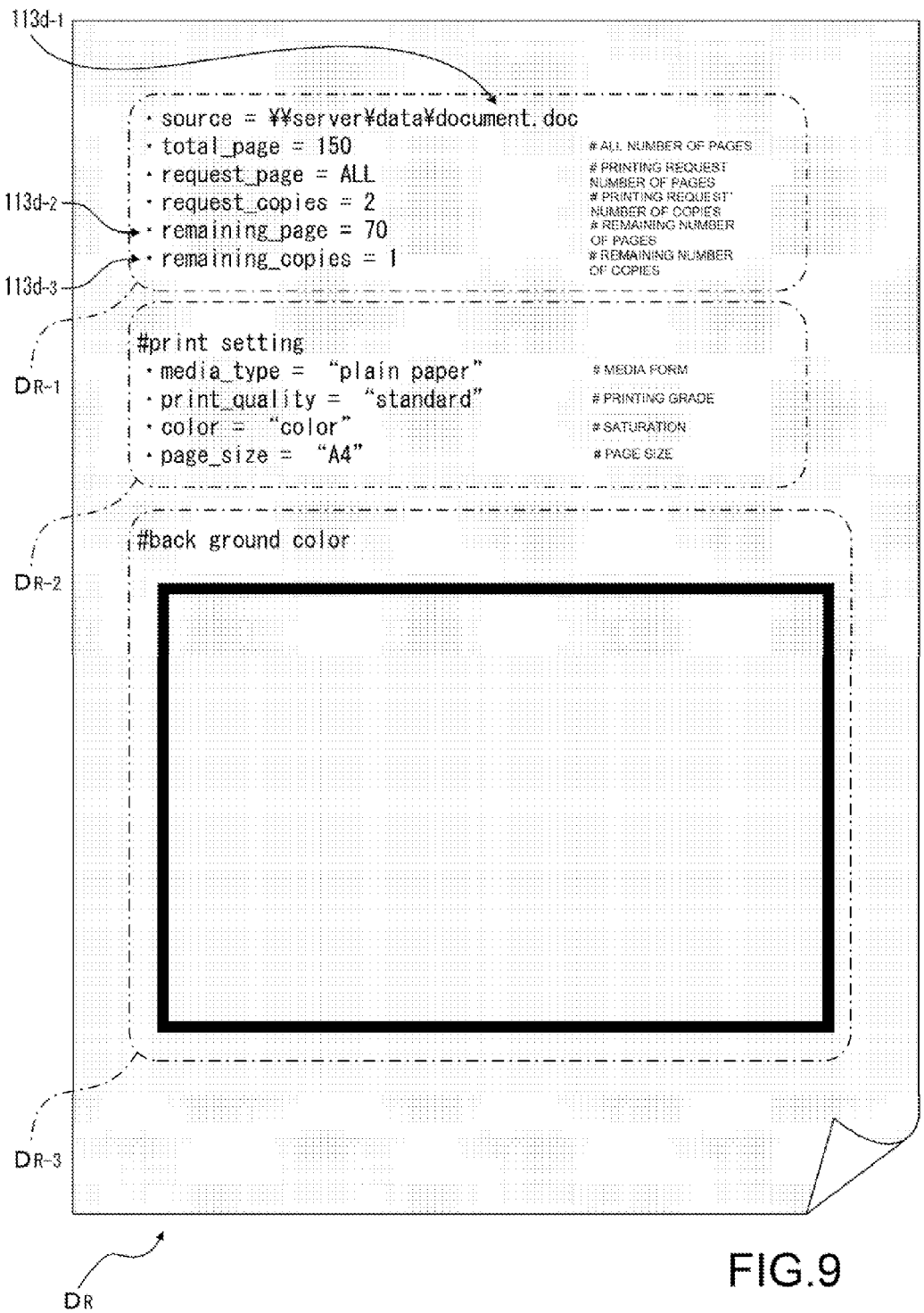
FIG. 9 is a figure showing an example of a configuration of interruption information page DR in each embodiment in the present disclosure.

In above-mentioned interruption information page DR, print page information DR-1, print setting information DR-2, and background color frame DR-3 are printed as the interruption information. As refer to FIG. 9, for an example of interruption information page DR, print page information DR-1 is printed on the upper row. In this print page information DR-1, file name (113d-1), the places where the file is stored (folder name, or the like), all the number of pages, the printing request number of pages in all the pages, printing request number of copies (number of copies), the number of the remaining print pages at the time of printing interruption, the remaining number of copies at the same, or the like, are included. According to the present embodiment, the information is formed as a character string.

Print-setting-information DR-2 is printed in the middle of interruption information page DR. In the print-setting-information DR-2, a type or paper quality of print sheet used at the time of printing interruption, a color of the print sheet, size of the print sheet, or the like, are included. In the present embodiment, the information is formed as a character string.

Background color frame DR-3 is printed in the lower of interruption information page DR. Background color frame DR-3 is for discriminating the background color (ground color) in this print sheet. For example, only a square frame is formed and nothing is printed within the square framework.

Then, the resumption preparation block (1) is explained. The resumption preparation block (1) is the process that, in resuming the interrupted printing process, records the various information at the time of interruption on the interruption information area 113d in memory part 113 in MFP 1'. That is, it is the process that reads and records the interruption information printed on interruption information page DR. Also, the resumption preparation block (1) is a process in MFP 1' in FIG. 7. Then, the resumption preparation block (1) is explained to be executed by CPU 111 in MFP 1' (Afterwards, it is similar to).

Figure 10:
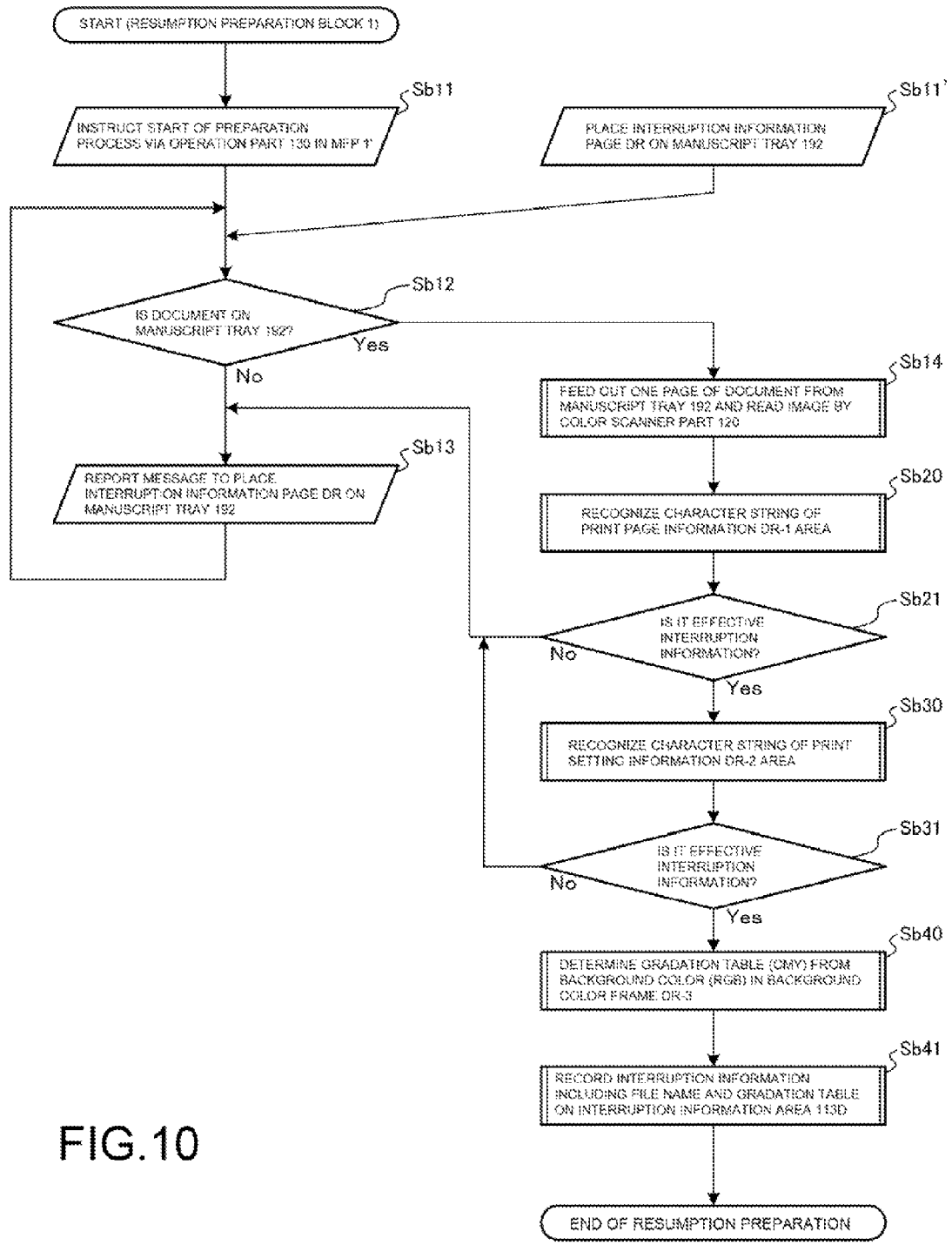
FIG. 10 is a flow chart that shows a flow of resumption preparation block (1) according to the first embodiment in the present disclosure.

In a resumption preparation block (1), as shown in the middle of FIG. 7, the preparation to read interruption information page DR, which is printed by MFP 1, by ADF 190 of MFP 1'. As refer to FIG. 10, firstly, user 100 instructs the start of the preparation process via electronic terminal 200 or operation part 130 of MFP 1' (step Sb11). In addition, as the process recommended in the present embodiment, user 100 places interruption information page DR on manuscript tray 192 (ADF 190) in MFP 1' (Step Sb11'). This is performed at a particular time before this step Sb11 or is carried out with step Sb11, simultaneously.

If the start of the preparation process is instructed, it is checked whether or not the documents are on manuscript tray 192 (step Sb12). If there is no document on manuscript tray 192, that is the case user 100 does not place interruption information page DR in manuscript tray 192 in Step Sb11', via display 131 and sound annunciator 133 in operation part 130, a message is reported to place interruption information page DR on manuscript tray 192 (step Sb13). Then, it returns to step Sb12. If documents are on manuscript tray 192 in step Sb12, one document is fed out from manuscript tray 192. Then, the image of the document fed out by color scanner part 120 is read (step Sb14).

Next, the character string of print page information DR-1 area is recognized from the image read in step Sb14 (step Sb20). Namely, here, from print page information DR-1 area of the image formed in interruption information page DR, the file name (113d-1) and place, all the number of pages, the printing request number of pages in all the pages, the printing request number of copies, the number of the remaining print pages at the time of printing interruption, and the remaining number of copies at the time of printing interruption, which should be recorded on interruption information area 113d, are extracted.

Here, if the information extracted from print page information DR-1 area is not valid (step Sb21), it moves to the process in step Sb13. On the other hand, if the information extracted from print page information DR-1 area is effective, the character string of print setting information DR-2 area is recognized from the image read in step Sb14 (step Sb30). Namely, from print setting information DR-2 area in the image formed in interruption information page DR, the type or paper quality of the print sheet, the color of the print sheet, and the size of the print sheet, which should be recorded on interruption information area 113d, are extracted.

Also in this case, if the information extracted from print setting information DR-2 area is not valid (step Sb31), it moves to the process in step Sb13. On the other hand, if the information extracted from print setting information DR-2 area is valid, it calculates for the gradation table that should be recorded on interruption information area 113d (step Sb40). This gradation table is calculated by a ground color of an average of whole region (all the pixels) inside of background color frame DR-3 in the image formed in interruption information page DR. Finally, the various interruption information determined in step Sb20, step Sb30, and step Sb40 is recorded on interruption information area 113d (step Sb41). Thereby, resumption preparation is ended.

Then, the resumption process block (1) is explained. The resumption process block (1), is the process to prevent, when the print data where printing has been interrupted is inputted, duplication of the print page and existing the paper in which tone, or the like, differ. Also, the resumption process block (1) is a process in MFP 1' in FIG. 7. Also, the resumption process block (1) is explained as executed by CPU 111 in MFP 1' (afterwards, it is similar to).

Figure 11:
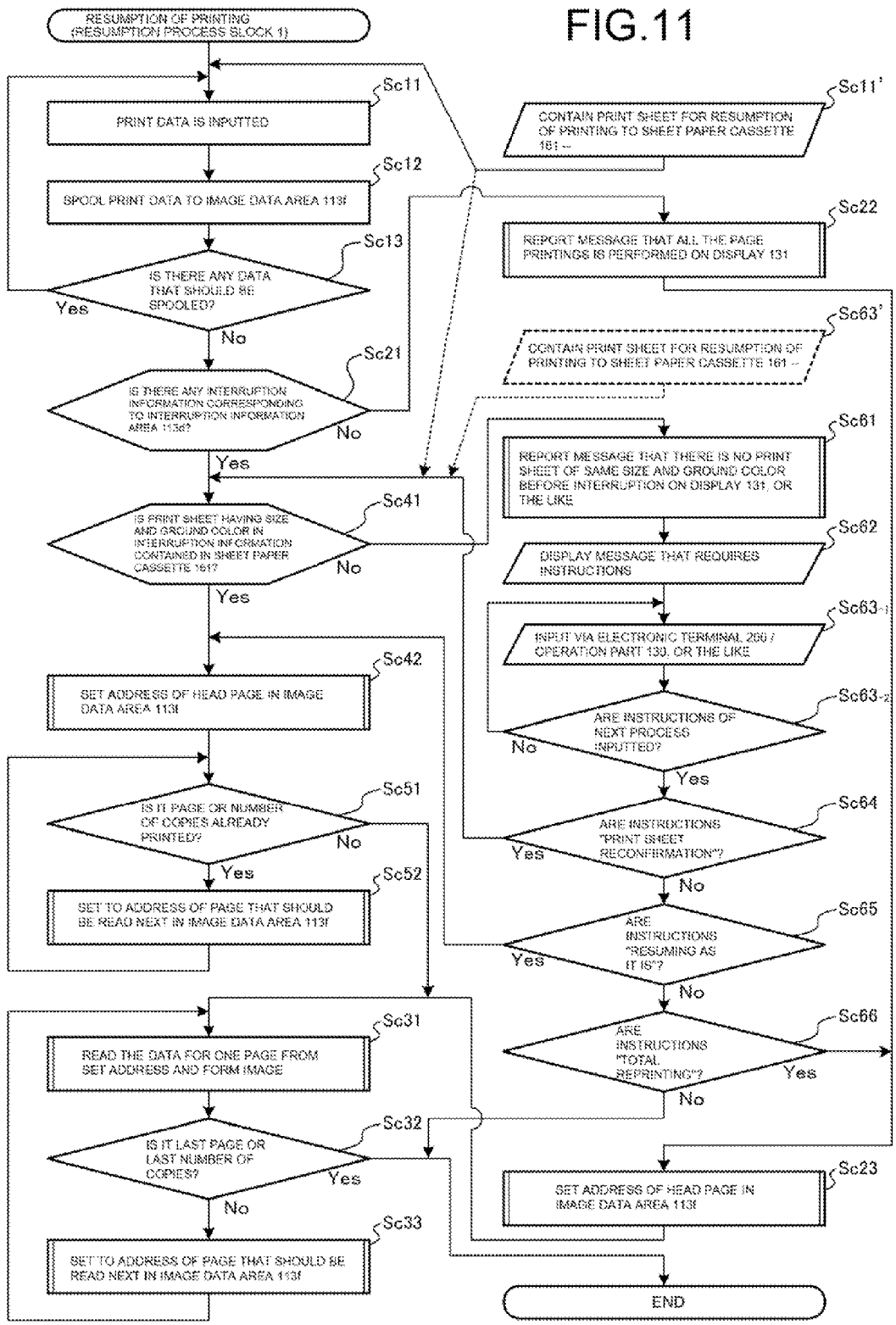
FIG. 11 is a flow chart that shows a flow of resumption process block (1) according to the first embodiment in the present disclosure.

As refer to FIG. 11, firstly, user 100 inputs print data into MFP 1' from electronic terminal 200, or the like (step Sc11). In this resumption process block (1), if the print sheet for resumption of printing, that is, the print sheet having the ground color and the size included in interruption information, is not contained by MFP 1', user 100, or the like, sets the print sheet for resumption of printing on sheet paper cassette 161—(Step Sc11 '). It is desirable to carry out this process before the process in Step Sc41 as described later. If print data is inputted in step Sc11, MFP 1' spools the inputted print data in image data area 113f (step Sc12). If there are print data that should be spooled further (step Sc13), it repeats from the process in step Sc11.

If there is no print data that should be spooled in step Sc13, it is checked whether or not the interruption information corresponding to the file name (113d-1), all the number of pages, or the request number of copies for the print data, which is inputted in above-mentioned step Sc11 to step Sc13, is recorded on interruption information area 113d (step Sc21). In step Sc21, if the interruption information corresponding to the print data inputted from the electronic terminal 200, or the like, is not present in interruption information area 113d, the message about "printing for all the page (all the number of copies)" from display 131, or the like, is reported (step Sc22). In this case, the address of a head page is set as the first page to be printed among the print data spooled to image data area 113f (step Sc23).

Then, the print data for one page are read from the set address of image data area 113f. Also, an image is formed in the paper fed out from sheet paper cassette 161—(step Sc31). Also, until formation of the image of the last page finishes (step Sc32), the address that should be read from image data area 113f to the next is set (step Sc33). Then, it returns to the process in step Sc31. The process is ended if the image of the last page is formed in step Sc32.

If the interruption information that corresponds to the print data inputted from the electronic terminal 200, or the like, in step Sc21 is present in interruption information area 113d, subsequently, it is checked whether or not the print sheet having the ground color and the size included in this interruption information is contained in anyone of sheet paper cassette 161—(step Sc41). Here, if the print sheet having the ground color and the size included in interruption information is contained any one of sheet paper cassette 161 —, the address of the head page is set as the first page to be printed (step Sc42). This is set in the print data spooled to image data area 113f.

Then, based on interruption information, it is checked whether or not the set page or the number of copies has already be printed (step Sc51). If already printed, the address that should be read to the next from image data area 113f is set (step Sc52). Then, it returns to the process in step Sc51. In step Sc51, if the set page or the number of copies has not been printed yet, it moves to step Sc31. Then, image formation is performed to the last of the print data spooled to image data area 113f. Then, the process is ended.

In above-mentioned step Sc41, if the print sheet having the ground color and the size included in the interruption information is contained neither of sheet paper cassette 161—, the message about "there is no print sheet having the same size and the ground color before interruption" is reported from display 131, or the like. Also, as required, an acoustic signal and a voice message are reported from sound annunciator 133 (step Sc61). Also, the message that requires instructions for the next process is reported to display 131, or the like (step Sc62). Here, MFP 1' waits to input instructions of the next process from operation part 130 or electronic terminal 200, or the like (step Sc63-1—step Sc63-2).

In step Sc63-2, if the input of instructions from operation part 130 or electronic terminal 200, or the like, is confirmed, and if the inputted instruction is "reconfirmation of the print sheet" (step Sc64), it returns to step Sc41. In addition, if the print sheet for resumption of printing is not contained in MFP 1', that is, if user 100 does not set the print sheet for resumption of printing in Step Sc11', user 100 set the print sheet for resumption of printing to sheet paper cassette 161—(Step Sc62'). This is performed after inputting instructions of "reconfirmation of print sheet" in step Sc63-1 and before returning to the process in step Sc41.

On the other hand, if the contents of the instructions in the confirmed input in step Sc63-2 are "resuming as it is" (step Sc65), it returns to step Sc42. This process is a process flow in case that the print sheet having different the size and the ground color may be existed after resumption of printing.

Furthermore, if the contents of the instructions in the confirmed input in step Sc63-2 are "total re printing" (step Sc66), it moves to step Sc23. This process is a process flow of a case in order that the print sheet having the size and the ground color used before printing interruption cannot be prepared at the time of resumption of printing but it may be unavoidably total-reprinted with a print sheet having a new ground color or the size.

Second Embodiment

Figure 12:
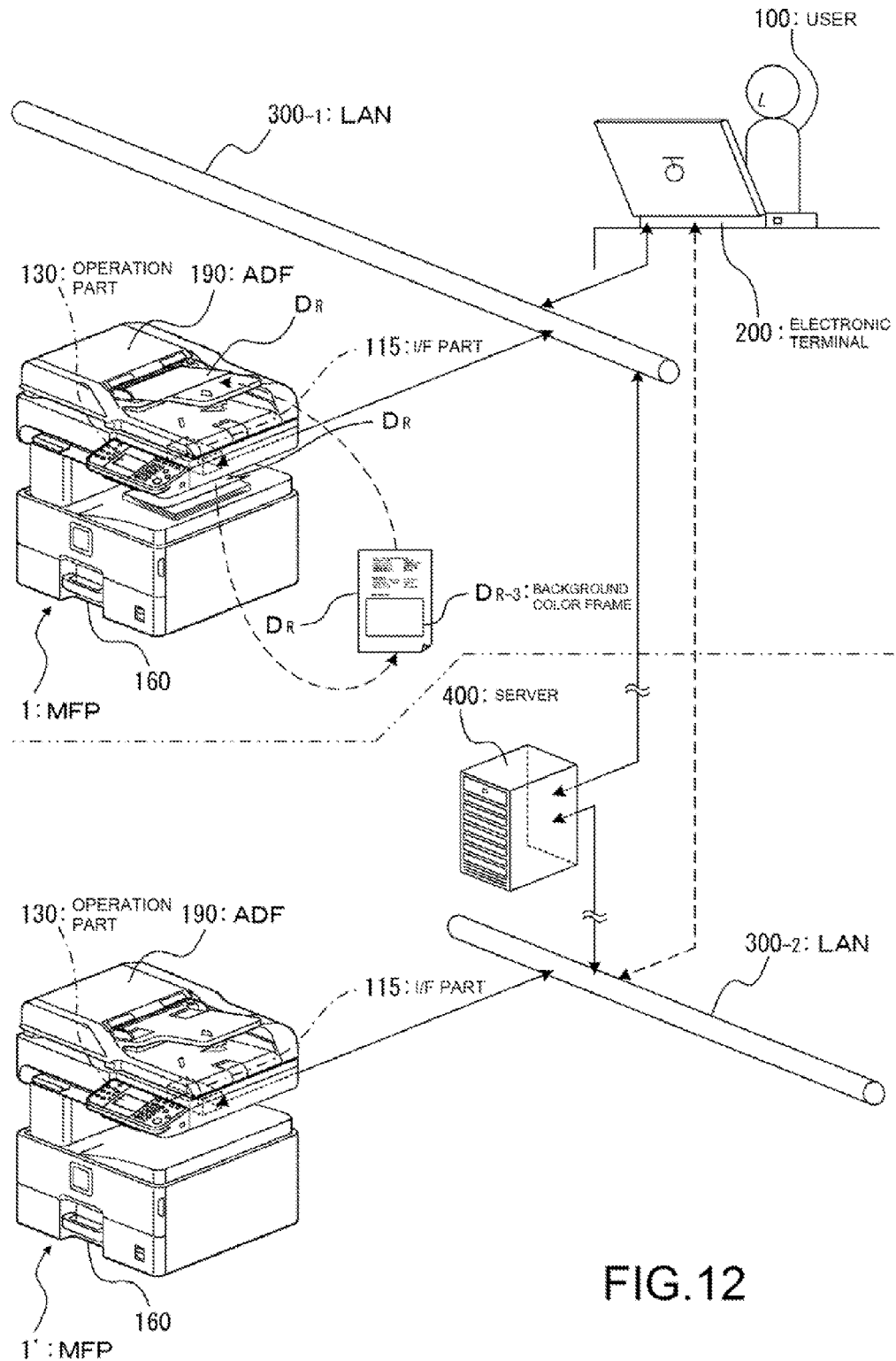
FIG. 12 is a figure showing an entire configuration according of interruption and resumption of a printing process in a second embodiment in the present disclosure.

According to a second embodiment, as shown in FIG. 12, user 100 performs a printing process with electronic terminal 200 connected to MFP 1 via LAN 300-1. Also here, user 100 includes the operator of electronic terminal 200, the operator of MFP 1, and the operator of MFP 1'. In the middle of this printing process being interrupted unavoidably, electronic terminal 200 is connected to MFP 1' via LAN 300-2, and the interrupted printing process is resumed. Also, LAN 300-1 and LAN 300-2 are connected with the external network. Also, MFP 1 and MFP 1' has the configuration that information can be read and be written to server 400 via LAN 300-1 or LAN 300-2, respectively. In this server 400, the area for storing the image data read in interruption information page DR is provided.

In addition, also in FIG. 12, MFP 1' has the same configuration as MFP 1. MFP 1 and MFP 1' once spool all the inputted print data to image data area 113f and prints them for each page.

Also, the present embodiment is roughly divided into "interruption process block (2)" and "resumption process block (2)."

Hereinafter, the contents of a process are explained for each processing block. The interruption process block (2) is the process in MFP 1 in FIG. 12. In interrupting the printing process, it prints to interruption information page DR. Also, this is the process that stores the image data read this interruption information page DR in server 400.

Figure 13:
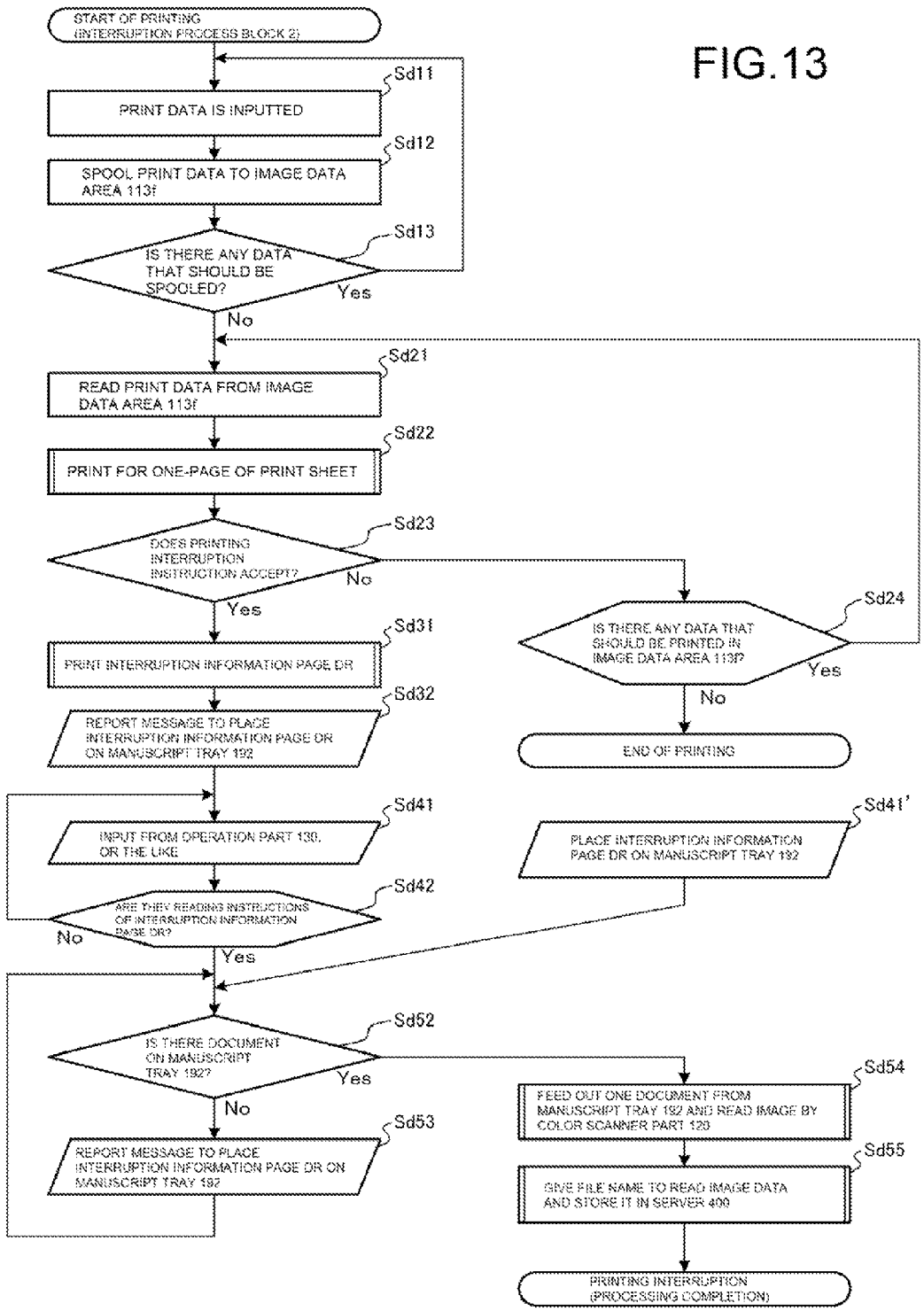
FIG. 13 is a flow chart that shows a flow of interruption process block (2) according to a second embodiment in the present disclosure.

As refer to FIG. 13, user 100 firstly inputs print data into MFP 1 from electronic terminal 200, or the like (step Sd11). The print data is information including image data and text data in addition to a file name, or the like. When the print data is inputted in step Sd11, MFP 1 spools the inputted print data to image data area 113f (step Sd12). If there is the print data that should be spooled (step Sd13), it repeats from the process in step Sd11.

If there are no print data that should be spooled in step Sd13, the print data for one page are read from image data area 113f (step Sd21). Then, one-page for the print sheet is printed by image formation part 150 (step Sd22). In this step Sd22, one sheet of the print sheet is fed out from sheet paper cassette 161-1 and 161-2—instructed from electronic terminal 200 or operation part 130. Then, the image based on the print data read from image data area 113f is formed on a print sheet by image formation part 150.

After printing for one page, it is confirmed whether or not instructions of printing interruption are performed from electronic terminal 200 or operation part 130 (step Sd23). If there is no instruction, further, it is confirmed whether or not the data that should be printed remains in image data area 113f (step Sd24).

In step Sd24, if it is determined that the data that should be printed remains in image data area 113f, it returns to step Sd21. Then, the print data for one page that should be printed to the next is read from image data area 113f. Printing is ended if the data that should be printed does not remain in image data area 113f in step Sd24.

In the above-mentioned step Sd23, if there are instructions of printing interruption from electronic terminal 200 or operation part 130, one sheet of the print sheet is fed out from one of sheet paper cassette 161-1, 161-2—that has been fed out the print sheet just before that. Then, interruption information page DR arranged interruption information is formed to this print sheet (step Sd31). The image content formed in this interruption information page DR is the same as what explained with reference to FIG. 9. Therefore, its explanation is omitted.

In step Sd31, after printing interruption information page DR, a message to place interruption information page DR on manuscript tray 192 is reported (step Sd32). This report is performed via electronic terminal 200, display 131, sound annunciator 133 in operation part 130, or the like. Here, MFP 1 waits for the input of reading instructions from terminal 200, operation part 130, or the like (step Sd41—step Sd42). In addition, in Step Sd41, when reading instructions are inputted from terminal 200, operation part 130, or the like, user 100 places interruption information page DR on manuscript tray 192 in MFP 1 (ADF 190), at the same time (Step Sd41').

In step Sd42, if it is determined that there is the input of the reading instructions from operation part 130, the electronic terminal 200, or the like, it is further confirmed whether or not the document is on manuscript tray 192 (step Sd52). If there are no document on manuscript tray 192, a message to place interruption information page DR on manuscript tray 192 is reported (step Sd53). This report is performed via display 131 and sound annunciator 133 in operation part 130. Then, it returns to step Sd52. In step Sd52, if it is confirmed that the document is on manuscript tray 192, one sheet of the document is fed out from manuscript tray 192. Then, the image of the document fed out by color scanner part 120 is read (step Sd54).

Finally, the file name (113*d*-1) inputted with the print data in step Sd11 is attached to the image read in step Sd54. Then, it is stored to specified area in server 400 (step Sd55). Then, the interruption process is ended.

Then, the resumption process block (2) is explained. The resumption process block (2) is a process for preventing duplication of the print page and mixture of the papers in which tone, or the like, are different when the print data where interrupted the printing is inputted. Also, in FIG. 12, resumption process block (2) is explained as a process for MFP 1'. Also, the resumption process block (2) is explained as executed by CPU 111 in MFP 1'.

Figure 14:
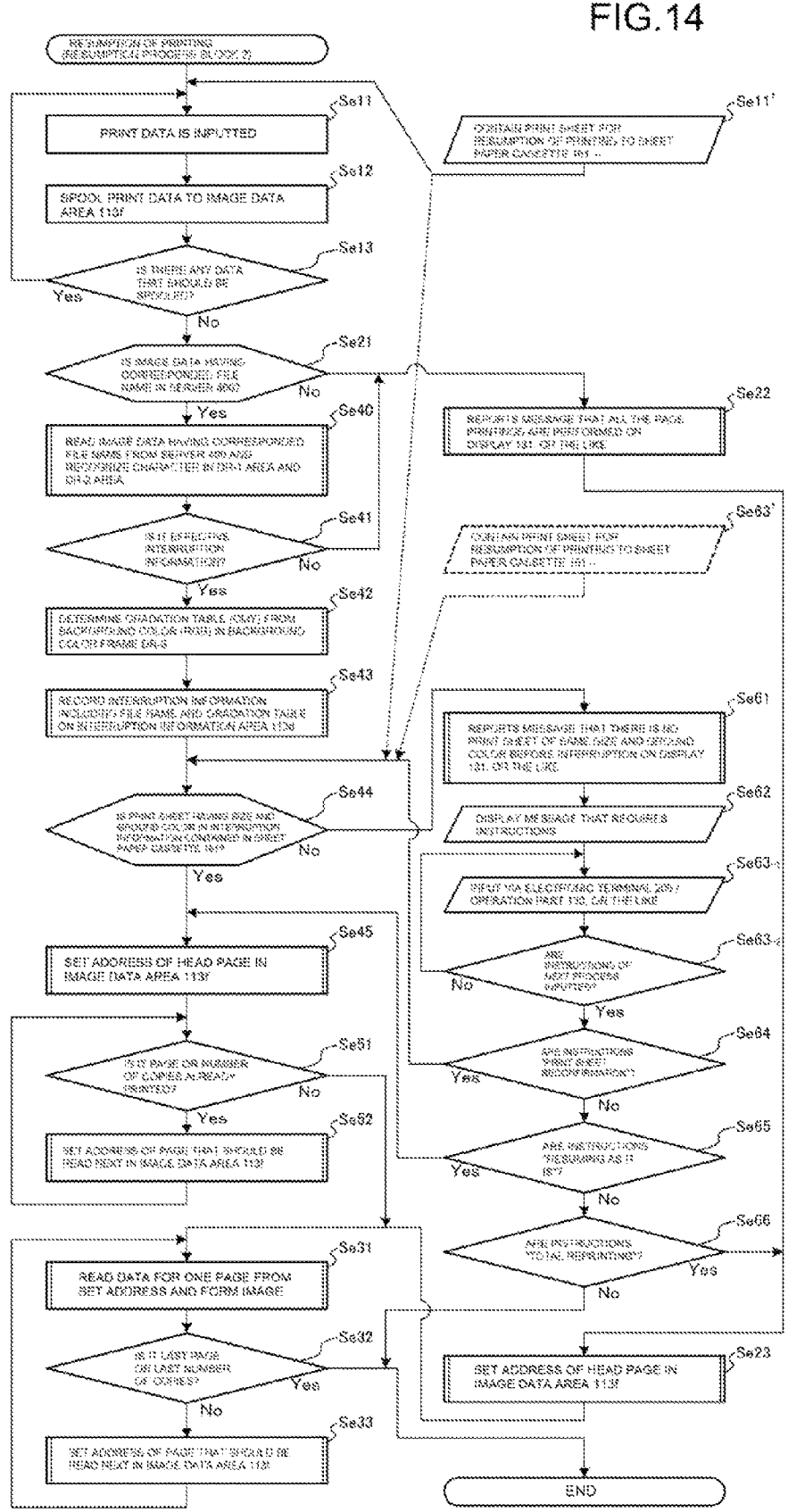
FIG. 14 is a flow chart that shows a flow of resumption process block (2) according to the second embodiment in the present disclosure.

As refer to FIG. 14, firstly, user 100 inputs print data into MFP 1' from electronic terminal 200, or the like (step Se11). In addition, in this resumption process block (2), if the print sheet for resumption of printing is not contained in MFP 1', user 100, or the like, sets the print sheet for resumption of printing in sheet paper cassette 161—(step Se11'). This print sheet is the print sheet having the ground color and the size included in interruption information. It is desirable to carry out this process before the process in step Se44 as described later. If the print data is inputted in step Se11, MFP 1' spools the inputted print data to image data area 113*f* (step Se12). If there is the print data that should be spooled (step Se13), it repeats from the process in step Se11.

If there is no print data that should be spooled in step Se13, it checks whether or not above-mentioned image data is stored in specified area in server 400 (step Se21). This image data is image data, which the file name (113*d*-1) about the print data inputted in step Se11 to step Se13 is given. In step Se21, if the target image data is not present in specified area in server 400, the message that "all the page (all the number of copies) printings are performed" is reported on display 131, or the like (step Se22). Then, the address of the head page is set as the first page to be printed among the print data spooled in image data area 113*f* (step Se23).

Then, the print data for one page is read from the set address of image data area 113*f*. Also, the image is formed on the paper fed out from sheet paper cassette 161—(step Se31). Then, until formation of the image for the last page finishes (step Se32), the address that should be read to the next is set from image data area 113*f* (step Se33). Subsequently, it returns to the process in step Se31. Then, the process is ended if the image of the last page is formed in step Se32.

In step Se21, if the target image data is present in the specified area in server 400, it reads the image data, which the target file name (113*d*-1) is given, from the specified area in server 400. Also, from the read image, the character string of print page information DR-1 area and the character string of print setting information DR-2 area are recognized (step Se40). Namely, here, from the image formed in interruption information page DR, the file name (113*d*-1) and place, all the number of pages, the printing request number of pages in all the pages, the printing request number of copies, the number of the remaining print pages at the time of printing interruption, the remaining number of copies at the time of printing interruption, the type of print sheet and the quality of paper, the color of the print sheet, and the size of the print sheet, which should be recorded on interruption information area 113*d*, are extracted.

Here, if the information extracted from the print page information DR-1 area and the print setting information DR-2 area is not valid (step Se41), it moves to the process in step Se22. On the other hand, if the information extracted from print page information DR-1 area and print setting information DR-2 area is valid, it calculates for the gradation table that should be recorded on interruption information area 113*d* (step Se42). This gradation table is calculated from the ground color of the average for the whole region (all the pixels) in background color frame DR-3 in the image data read in step Se40. Further, the various interruption information extracted from the image data read in step Se40 in this way is recorded on interruption information area 113*d* (step Se43).

Next, it is confirmed whether or not the print sheet having the ground color and the size included in this interruption information is contained in anyone of sheet paper cassette 161—(step Se44). Here, if the print sheet having the ground color and the size included in the interruption information is contained in anyone of sheet paper cassette 161 —, the address of the head page is set as the first page to be printed (step Se45). The setting address is within the print data spooled in image data area 113*f*.

Then, based on the interruption information, it checks whether or not the set page or number of copies has already printed (step Se51). If already printed, the address that should be read to the next is set in image data area 113*f* (step Se52). Then, it returns to the process in step Se51. In step Se51, if the set page or number of copies has not been printed yet, it moves to step Se31. Then, image formation is performed to the last of the print data spooled in image data area 113*f*, and the process is ended.

In above-mentioned step Se44, if the print sheet having the ground color and the size included in interruption information is contained in neither of sheet paper cassette 161 —, the message that "there is no print sheet having the same size and the ground color before interruption" is reported on display 131, or the like. Also, an acoustic signal and a voice message are reported from sound annunciator 133 if needed (step Se61). Also, the message that requires instructions of the next process is reported on display 131, or the like (step Se62). Here, MFP 1', waits to input instructions of the next process via operation part 130, electronic terminal 200, or the like (step Se63-1—step Se63-2).

In step Se63-2, in case that the input of instructions from operation part 130, electronic terminal 200, or the like, is confirmed, if the inputted instructions are "reconfirmation of the print sheet" (step Se64), it returns to step Se44. In addition, in case that the print sheet for resumption of printing is not contained in MFP 1', namely, if user 100 does not set the print sheet for resumption of printing in step Se11', user 100 sets the print sheet for resumption of printing to sheet paper cassette 161—(step Se62'). This is after inputting instructions of "reconfirmation of the print sheet" in step Se63-1 and before returning to the process in step Se44.

On the other hand, if the contents of the instructions in the checked input in step Se63-2 are "resuming as it is" (step Se65), it returns to step Se45. This process is a process flow in case that the print sheet having the different size and ground color may be mixed after resumption of printing.

If the contents of the instructions in the checked input in step Se63-2 are "total reprinting" (step Se66), it moves to step Se23. This process is a process flow of a case for such unavoidably total reprinting with the print sheet having a new ground color or a size. That is a case where the print sheet of the size and the ground color used before printing interruption is not able to be prepared at the time of resumption of printing.

Third Embodiment

Figure 15:
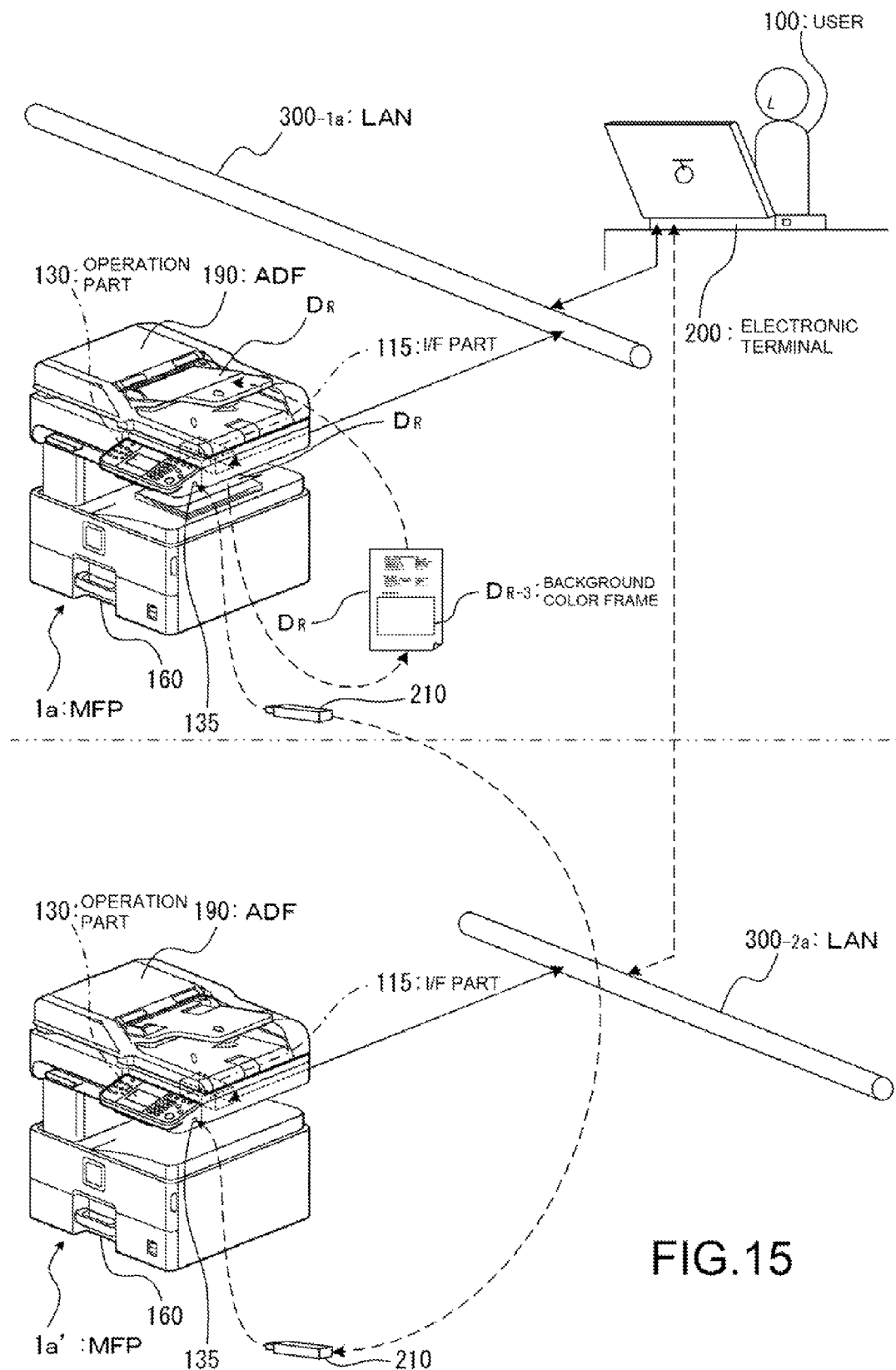
FIG. 15 is a figure showing entire configuration according to interruption and resumption of a printing process in the third embodiment in the present disclosure.

According to the third embodiment, as shown in FIG. 15, user 100 performs a printing process with electronic terminal 200 connected with MFP 1a (first image forming apparatus). Here, user 100 also includes the operator of electronic terminal 200 and the operator of MFP 1a, or the like. This printing process is unavoidably interrupted in the middle of that. Then, electronic terminal 200 is connected with MFP 1a' (first image forming apparatus), and the interrupted printing process is resumed. In that case, external memory 210 is connected with MFP 1a, and the various information related to the resumption of the printing process is recorded on external memory 210. When resuming printing by MFP 1a', the various information related to the resumption of the printing process is read from this external memory 210. In addition, as an example, MFP 1a is connected with LAN 300-1a, and MFP 1a' is connected to LAN 300-2a. However, there may be no direct or indirect connection between LAN 300-1a and LAN 300-2a.

Figure 16:
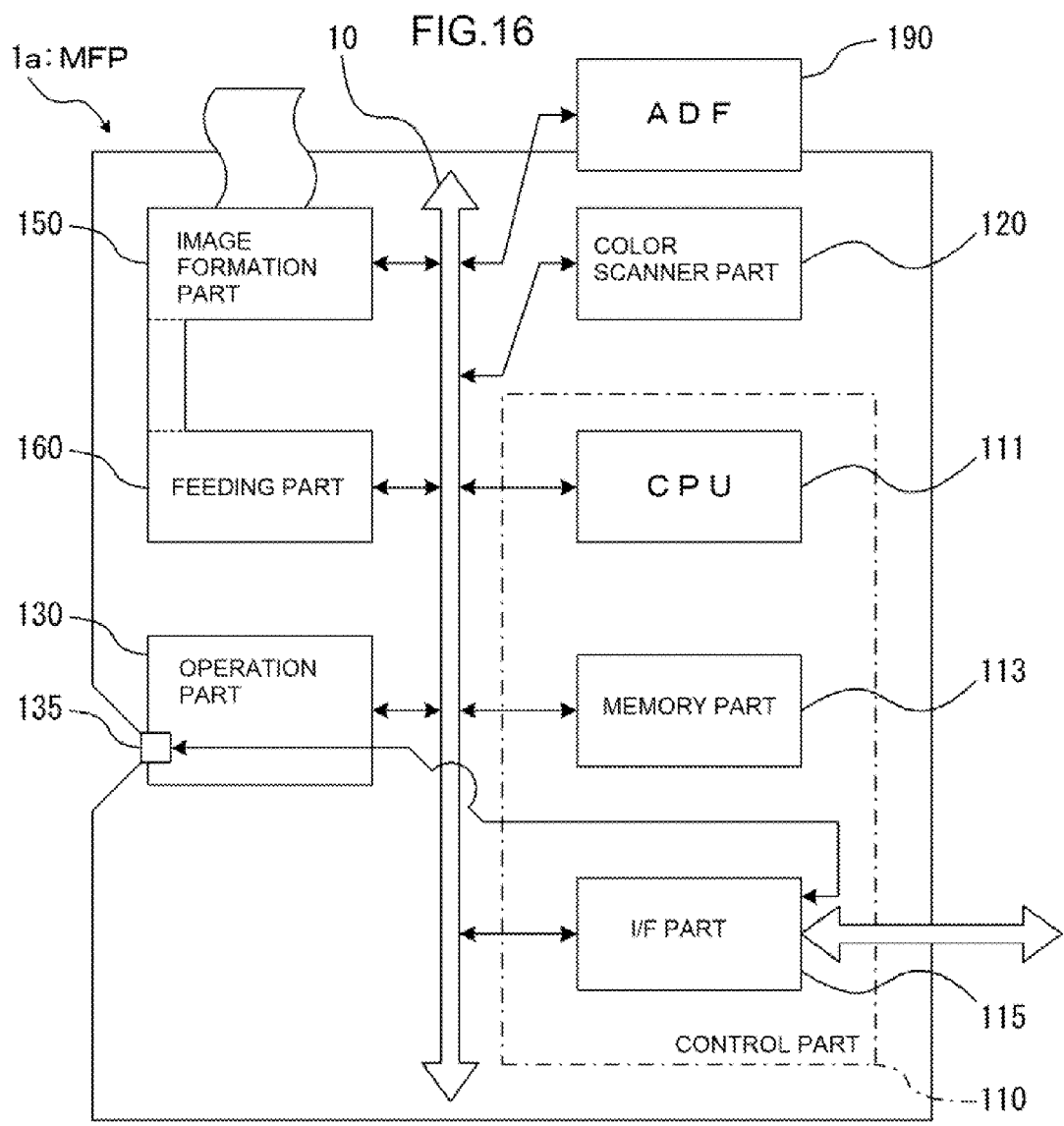
FIG. 16 is a figure showing an example of a configuration of a control system of MFP 1a in the third embodiment in the present disclosure.

In FIG. 16, an example of a configuration for the control system in MFP 1a is shown. In addition, in FIG. 16, the same numerals are given in the configuration corresponding to each part shown in FIG. 2, and the explanation is omitted. As shown in FIG. 15 and FIG. 16, external terminal 135 is provided in the side of operation part 130. Electrically, external terminal 135 is a terminal that connects I/F part 115 with an outside apparatus.

In addition, also in FIG. 15, MFP 1a' may have the same configuration as MFP 1a. MFP 1a and MFP 1a' once spools all the inputted print data to image data area 113f and prints them for each page.

This third embodiment is roughly divided into "interruption process block (3)" and "resumption process block (3)." Hereinafter, the contents of the process are explained for each processing block. The interruption process block (3) is the process in MFP 1a in FIG. 15. The interruption process block (3) is the process to print interruption information page DR for interrupting a printing process. Also, the interruption process block (3) is a process that stores the image data read this interruption information page DR in external memory 210.

Figure 17:
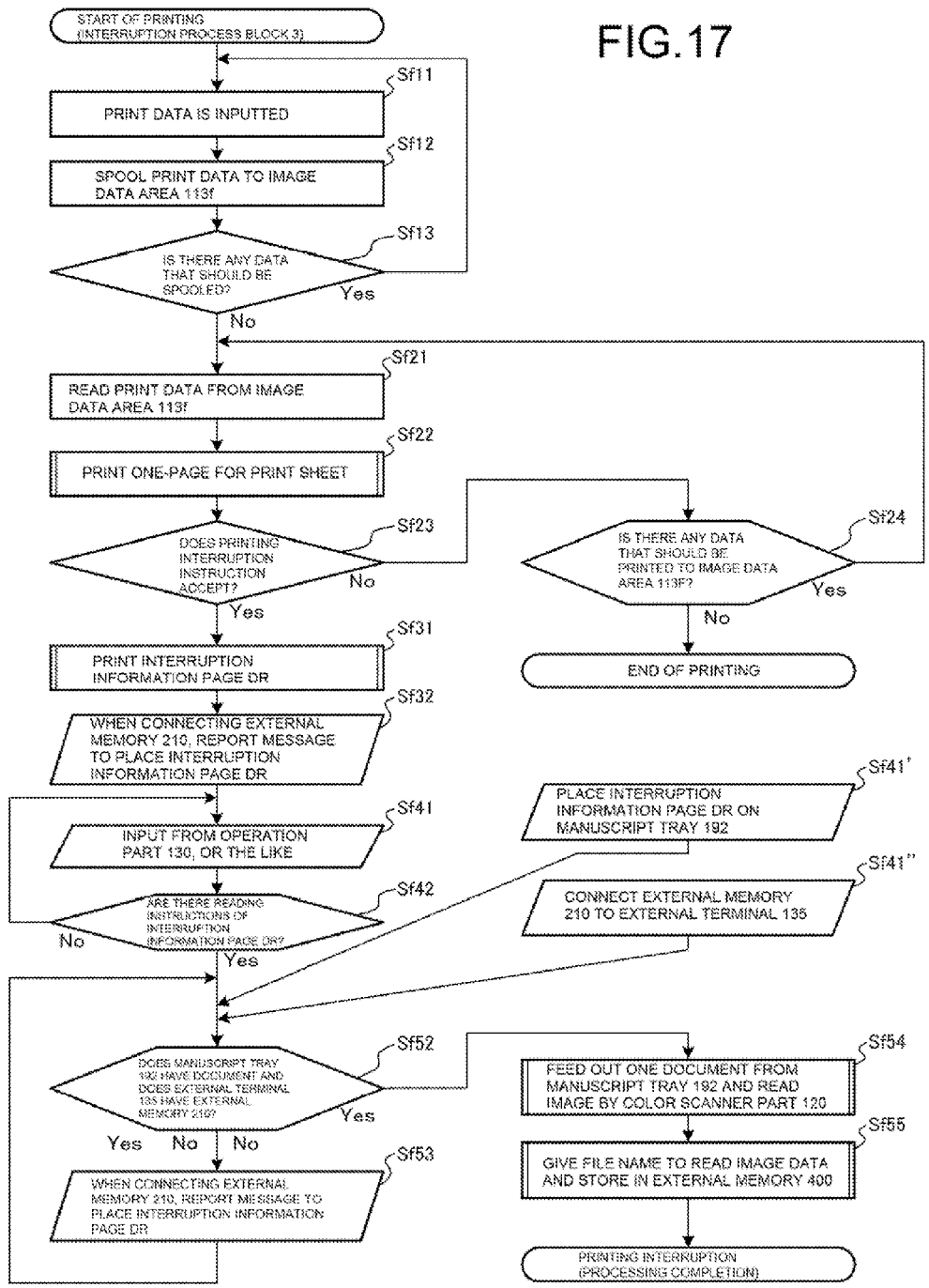
FIG. 17 is a flow chart that shows a flow of interruption process block (3) according to the third embodiment in the present disclosure.

As FIG. 17 is referred to, firstly, user 100 inputs the print data into MFP 1a from electronic terminal 200, or the like (step Sf11). The print data is image data and text data in addition to information including a file name, or the like. If the print data is inputted in step Sf11, MFP 1a spools the inputted print data in image data area 113f (step Sf12). If there is more print data that should be spooled (step Sf13), it repeats from the process in step Sf11.

If there is no print data that should be spooled in step Sf13, the print data for one page is read from image data area 113f (step Sf21). Then, an one-page of the print sheet is printed by image formation part 150 (step Sf22). In this step Sf22, one sheet of the print sheet is fed out from sheet paper cassette 161-1, 161-2 —, which is instructed from electronic terminal 200 or operation part 130. Then, the image based on the print data read from image data area 113f is formed on the print sheet by image formation part 150.

After printing for one page, it is confirmed whether or not the printing interruption is instructed from electronic terminal 200 or operation part 130 (step Sf23). If there is no instructions, further, it is checked whether or not the data that should be printed remains in image data area 113f (step Sf24).

If it is determined that the data that should be printed remains in image data area 113f in step Sf24, it returns to step Sf21, and the print data for one page that should be printed to the next is read from image data area 113f. If the data that should be printed does not remain in image data area 113f in step Sf24, the printing is ended.

If there are instructions of printing interruption from electronic terminal 200 or operation part 130 in abovementioned step Sf23, one sheet of the print sheet is fed out from one of sheet paper cassette 161-1, 161-2 —, which fed out the print sheet just before the instructions. Then, interruption information page DR arranged interruption information is formed on this print sheet (step Sf31). The image content formed in this interruption information page DR is the same as the contents explained with reference to FIG. 9.

After printing interruption information page DR in step Sf31, via electronic terminal 200 or the like, display 131 or sound annunciator 133 in operation part 130, a message for connecting external memory 210 to external terminal 135 is reported. Also, a message for placing interruption information page DR on manuscript tray 192 is reported (step Sf32). Here, MFP 1a waits for the input of reading instructions from terminal 200, or the like, or operation part 130 (step Sf41-step Sf42). In addition, when the reading instructions are inputted from terminal 200, or the like, or operation part 130 in step Sf41, user 100 places interruption information page DR on manuscript tray 192 (ADF 190) in MFP 1, simultaneously (Step Sd41'). Also, user 100 connects external memory 210 to external terminal 135 (Step Sf41").

If it is determined that there is an input of reading instruction in operation part 130, electronic terminal 200, or the like, in step Sf42, it is checked whether the document is or is not on manuscript tray 192 and external memory 210 is or is not connected with external terminal 135 (step Sf52). If there is no document on manuscript tray 192 or if external memory 210 is not connected with external terminal 135, a message to place interruption information page DR on manuscript tray 192 and to connect external memory 210 with external terminal 135 is reported (step Sf53). This report is performed via display 131 or sound annunciator 133 of operation part 130. Then, it returns to step Sf52.

If it is checked that the document is on manuscript tray 192 in step Sf52 and external memory 210 is connected with external terminal 135, one page of the document is fed out from manuscript tray 192. Then, the image of the documents fed out by color scanner part 120 is read (step Sf54).

Finally, the file name (113d-1) inputted with the print data in step Sf11 is attached to the image read in step Sf54. Then, it stores in the specified area in external memory 210 (step Sf55), and the interruption process is ended.

Then, the resumption process block (3) is explained. The resumption process block (3) is the process to prevent duplicating the print page and mixing the paper in which tone, or the like, is different when the print data that printing is interrupted are inputted. Also, the resumption process block (3) is the process in MFP 1a' in FIG. 15. The resumption process block (3) is explained as executed by CPU 111 in MFP 1a'.

Figure 18:
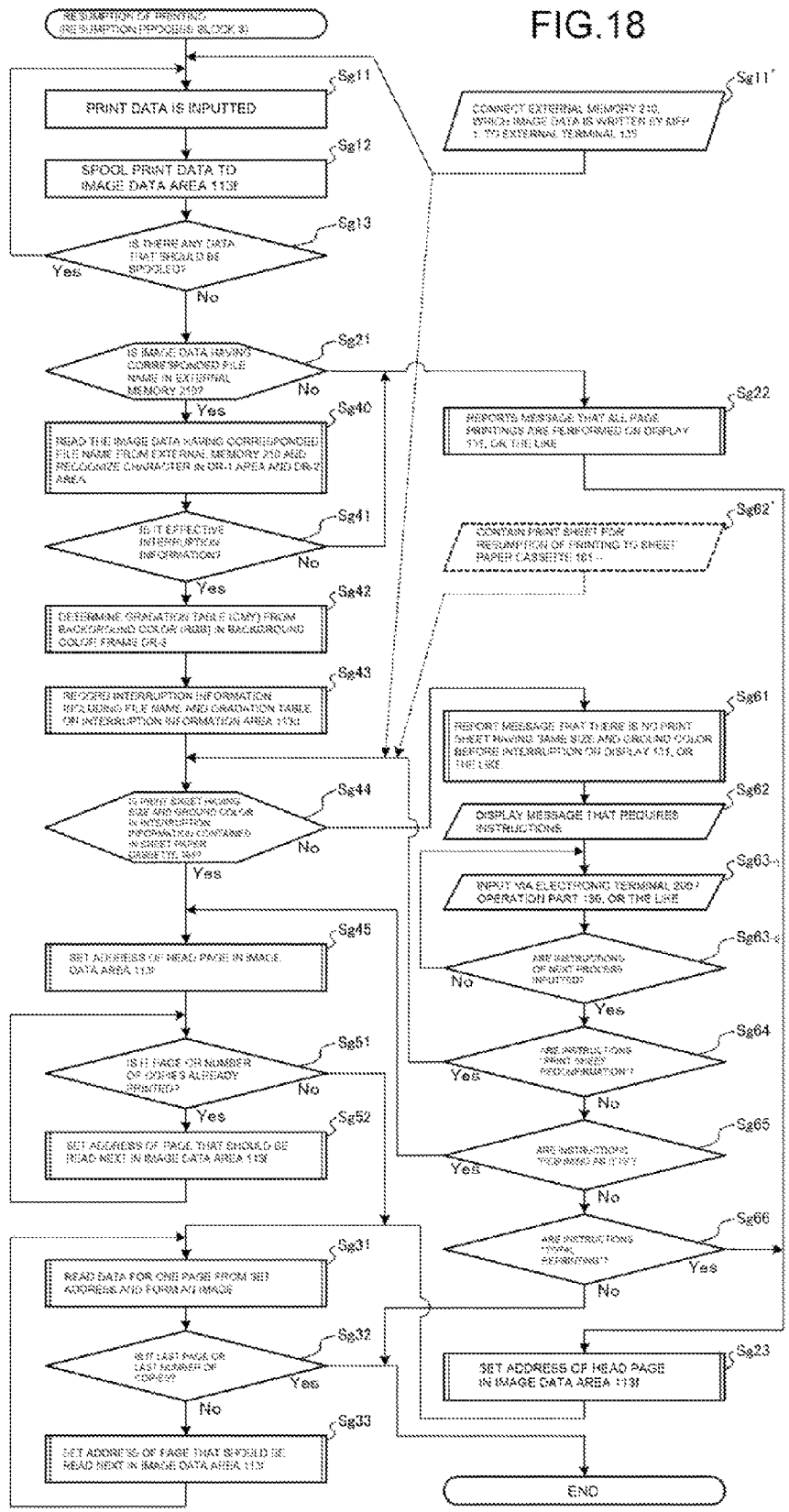
FIG. 18 is a flow chart that shows a flow of resumption process block (3) according to the third embodiment in the present disclosure.

As referred to FIG. 18, firstly, user 100 inputs the print data into MFP 1a' from electronic terminal 200, or the like (step Sg11). In addition, in this resumption process block (3), if the print sheet for resumption of printing is not contained in MFP 1a', user 100, or the like, sets the print sheet for resumption of printing to sheet paper cassette 161—(Step Sg11').

The print sheet is a print sheet having the ground color and the size included in interruption information. Also, it is desirable to carry out this process before the process in Step Sg44 as described later. If the print data is inputted in step Sg11, MFP 1a' spools the inputted print data to image data area 113f (step Sg12). Further, if there is the print data that should be spooled (step Sg13), it repeats from the process in step Sg11.

If there is no print data that should be spooled in step Sg13, it is checked whether the image data is stored in the specified area in external memory 210 (step Sg21). This image data is the image data to which the file name (113d-1) about the print data inputted in above-mentioned step Sg11 to step Sg13 is given. If the target image data is not present in the specified area in external memory 210 in step Sg21, the message "printing all the page (all number of copies) is performed" is reported on display 131, or the like (step Sg22). Then, in the print data spooled in image data area 113f, the address of the head page is set as the first page to be printed (step Sg23).

Then, the print data for one page is read from the set address in image data area 113f. Also, the image is formed on the paper fed out from sheet paper cassette 161—(step Sg31). Then, until finishing formation of the image of the last page (step Sg32), the address that should be read to the next is set in image data area 113f (step Sg33). Subsequently, it returns to the process in step Sg31. The process is ended if the image of the last page forms in step Sg32.

In step Sg21, if the target image data is present in the specified area in external memory 210, the image data given the target file name (113d-1) is read from the specified area in external memory 210. Also, by the read image, the character string of print page information DR-1 area and the character string of print setting information DR-2 area are recognized (step Sg40). Namely, here, from the image formed in interruption information page DR, the file name (113d-1) and place, all the number of pages, the printing request number of pages in all the pages, printing request number of copies, the number of the remaining print pages at the time of printing interruption, the remaining number of copies at the time of printing interruption, the type of print sheet and the quality of paper, the color of the print sheet, and the size of the print sheet, which should be recorded on interruption information area 113d, are extracted.

Here, if the information extracted from print page information DR-1 area and print setting information DR-2 area is not valid (step Sg41), it moves to the process in step Sg22, On the other hand, if the information extracted from print page information DR-1 area and print setting information DR-2 area is valid, by using the ground color for the average of the whole region (all the pixels) in the background color frame DR-3 in the image data read in step Sg40, it calculates the gradation table that should be recorded on interruption information area 113d (step Sg42). Furthermore, in this way, various interruption information extracted from the image data read in step Sg40, is recorded on interruption information area 113d (step Sg43).

Then, it is checked whether or not the print sheet having the ground color and the size included in this interruption information is contained any one of sheet paper cassette 161—(step Sg44). Here, if the print sheet having the ground color and the size included in the interruption information is contained any one of sheet paper cassette 161 —, the address of the head page is set as the first page to be printed among the print data spooled in image data area 113f (step Sg45).

Then, based on the interruption information, it is checked whether or not the set page or the number of copies has already printed (step Sg51). If already printed, the address that should be read to the next is set from image data area 113f (step Sg52). Then, it returns to the process in step Sg51. If the set page or the number of copies has not been printed yet in step Sg51, it moves to step Sg31. Then, image formation is performed to the last of the print data spooled in image data area 113f, and the process is ended.

In above-mentioned step Sg44, if the print sheet having the ground color and the size included in the interruption information is contained neither of sheet paper cassette 161 —, the message "there is no print sheet having same size and ground color before interruption" is reported on display 131, or the like (step Sg62). Here, MFP 1a' waits to input instructions of the next process via operation part 130, electronic terminal 200, or the like (step Sg63-1—step Sg63-2).

In case that the input of instructions from operation part 130, electronic terminal 200, or the like, is confirmed in step Sg63-2, and if the inputted instructions is "reconfirmation of the print sheet" (step Sg64), it returns to step Sg44. In addition, if the print sheet for resumption of printing is not contained in MFP 1', that is, when user 100 does not set the print sheet for resumption of printing in Step Sg11', user 100 sets the print sheet for resumption of printing to sheet paper cassette 161—(Step Sg62'). This is performed after inputting instructions of "reconfirmation of print sheet" in step Sg63-1 and before returning to the process in step Sg44.

On the other hand, if the contents of the instructions of the checked input in step Sg63-2 are "resuming as it is" (step Sg65), it returns to step Sg45. This process is a process flow in case that the print sheet having the different size and the ground color after resumption of printing may be mixed.

Furthermore, if the contents of the instructions in the checked input in step Sg63-2 are "total reprinting" (step Sg66), it moves to step Sg23. This process is a process flow of a case for such unavoidably total reprinting with the print sheet having a new ground color or a size. That is, it is a case where the print sheet having the size or the ground color used before printing interruption is not able to be prepared at the time of resumption of printing.

As explained above, according to each embodiment in the present disclosure, interruption information page DR is formed by MFPs 1 and 1a at the time of interruption of the image formation based on the inputted print data. Then, if the print data is inputted to MFPs 1' and 1a', MFPs 1' and 1a' extracts the interruption information and the ground color of the print sheet by using the image data according to interruption information page DR. Subsequently, the image formation is resumed.

At this time, interruption information page DR is read by color scanner part 120 of MFP 1'. Then, the interruption information and the ground color of the print sheet are extracted by using the image data according to the interruption information page DR (first embodiment). Or, interruption information page DR is read by color scanner part 120 of MFPs 1 and 1a, the image data according to this interruption information page DR is recorded on server 400 or external memory 210, and the image data according to the interruption information page DR is read. In this case, MFPs 1' and 1a' reads from server 400 (second embodiment). Or, it reads from external memory 210 (third embodiment). Then, the interruption information and the ground color of the print sheet are extracted by using the image data according to this interruption information page DR.

Here, if a print sheet equivalent to the specification extracted from the image data according to interruption information page DR formed by MFPs 1 and 1a is in the feeding part of MFP 1' and 1a', only the image of the remaining number of pages and the remaining number of copies at the time of interrupting formation of the image for MFPs 1 and 1a is formed in a print sheet. Also, if there is no print sheet equivalent to the specification extracted from the image data according to interruption information page DR formed by MFPs 1 and 1*a* in the feeding part of MFP 1' and 1*a'*, the informing part reports that effect. Or, it waits about instructions of the process at the time of resumption of image formation by MFP 1' and 1*a'*, and, based on the inputted instructions, all the pages and all the number of copies of the inputted print data are formed in print sheets. Thereby, the effect is produced that it can be prevented to mix the paper having the different paper quality in the bundle of the printed documents without being a print sheet useless.

Figure 19:
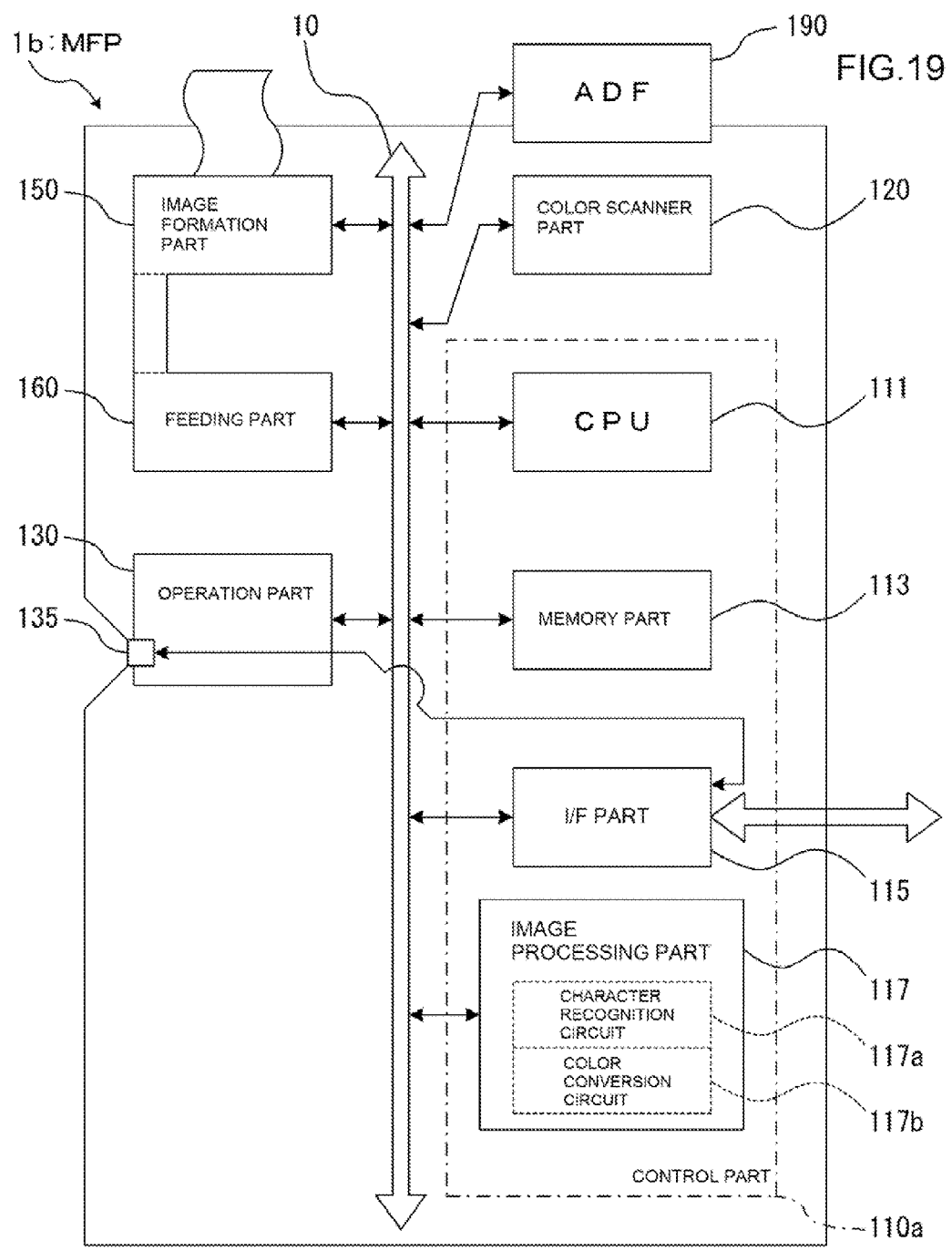
FIG. 19 is a figure showing the example of a configuration of the control system of MFP 1b according to the modification of the embodiment in the present disclosure.

In addition, the present disclosure is not limited to each of above-mentioned embodiment, and it is clear that each embodiment may be suitably changed within the limits of the technology conception in the present disclosure. The modification of the embodiment in the present disclosure is shown in FIG. 19 and FIG. 20. In addition, in FIG. 19 and FIG. 20, the same numerals are given to the parts corresponding to the configuration as shown in FIG. 2 or FIG. 16, and FIG. 4.

In MFP 1*b* shown in FIG. 19, control part 110*a* includes CPU 111, memory part 113, and I/F part 115, in addition to image processing part 117. Image processing part 117 is provided in control part 110*a* as a chip of an integrated circuit, and its peripheral circuit. Then, character recognition circuit 117*a*, color conversion circuit 117*b*, or the like, can be included in image processing part 117.

Thus, when it has character recognition circuit 117*a* and color conversion circuit 117*b* as an integrated circuit, as shown in FIG. 20, it becomes unnecessary to prepare a character recognition program, a color conversion table, a color conversion program in memory part 113. Therefore, the storage capacity of memory part 113 can be reduced, and the process of character recognition or color conversion can be accelerated.

Figure 21:
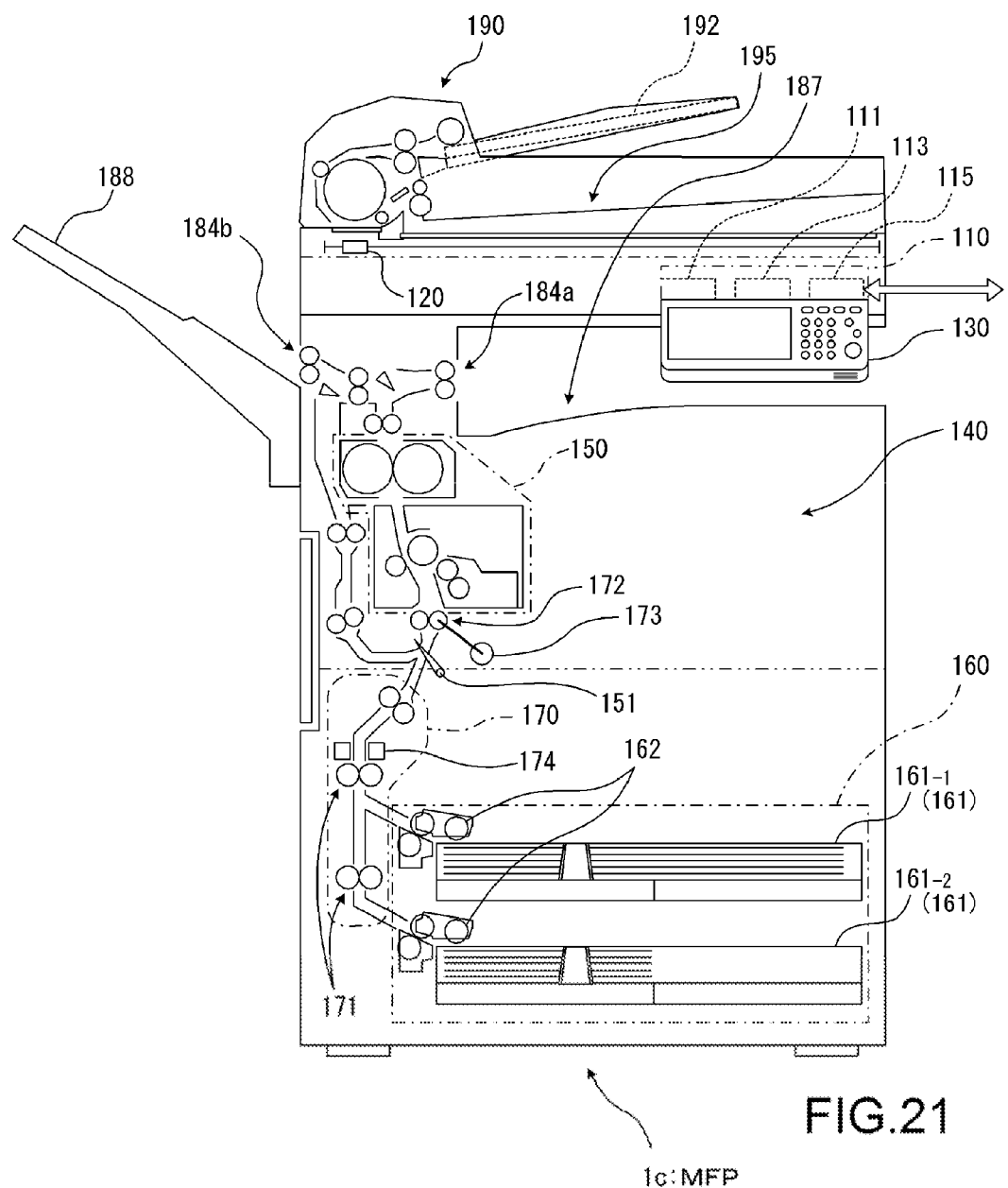
FIG. 21 is a figure showing an example of an internal configuration of the whole MFP 1c according to another modification of the embodiment in the present disclosure.
Figure 22:
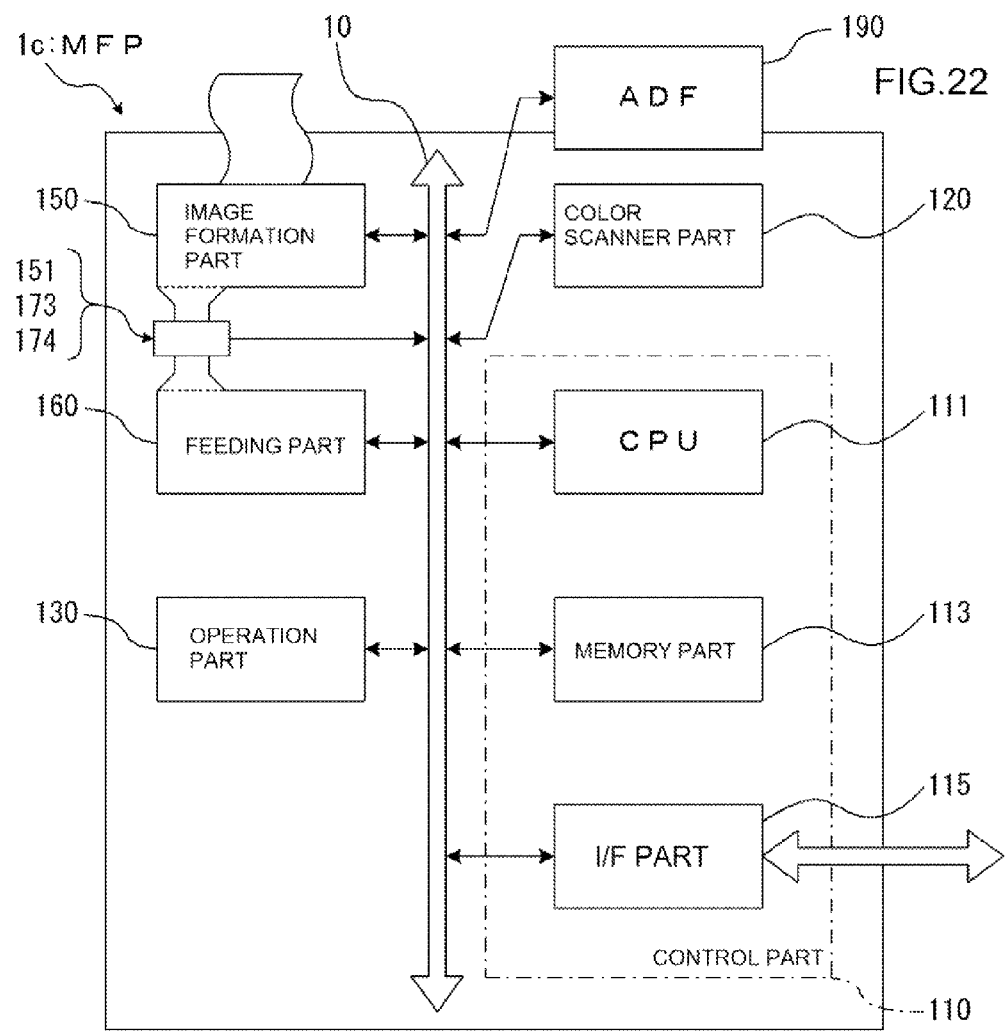
FIG. 22 is a figure showing an example of a configuration of the control system of MFP 1c according to another modification of the embodiment in the present disclosure.

Also, another modification of the embodiment in the present disclosure is shown in FIG. 21 and FIG. 22. In the FIG. 21 and the FIG. 22, the same numerals are given to the part corresponding to the configuration as shown in FIG. 1 or FIG. 2.

In MFP 1*c* shown in FIG. 21 and FIG. 22, resist roller pair 172 positions the print sheet just before being conveyed to image formation part 150. Resist roller pair 172 is rotated at exact fixed number of rotations, for example with stepping motor 173. Therefore, the amount of rotations of resist roller pair 172 can be grasped, accurately.

Resist sensor 151 is configured, as an example, by combination with a lever pressed with passage of a print sheet and an electric switch turned on or turned off by motion of the lever. Resist sensor 151 detects from reaching of the front-end part to passing of the rear-end part for the print sheet. CPU 111 measures the time required for passing the print sheet on resist sensor 151. CPU 111 can accurately-grasp the amount of rotations of resist roller pair 172. Therefore, the length of the print sheet toward the transportation direction is computed by the time needed to pass.

Sensor 174 detects the double feed (overlap) of the print sheet, as an example, based on the transmission loss of an ultrasonic wave, or the like. Accordingly, CPU 111 can also recognize the difference in the thickness of the print sheet conveyed to carrying path 170.

In this example, sheet paper cassette 161—contained the print sheets is loaded with MFP 1*c*.

Then, when the specification of the print sheets, or the like, is inputted from operation part 130, one sheet of the print sheets is fed out from loaded sheet paper cassette 161 —.

When the fed out print sheet passes sensor 174, resist sensor 151, or the like, CPU 111 can recognize the thickness and the length toward the transportation direction of the print sheet. It may discharge the print sheet without forming an image.

Based on this thickness and length, among the preset area 113*c*-1 in memory part 113 (as refer to FIG. 4 or FIG. 20), the candidate of the print sheet placed on sheet paper cassette 161—is selected. Then, for example, this candidate list is displayed on display 131 in operation part 130. By performs like this, in each column of sheet paper cassette 161-1, 161-2,—in paper information area 113*c*, the specification of the print sheet can be recorded more accurately.

Further, in step Sa22 shown in FIG. 8, step Sd22 in FIG. 13, and step Sf22 in FIG. 17, when one-page of the print sheet is printed by image formation part 150, the thickness of the print sheet and the length toward the transportation direction may be recognized. Then, the thickness and length is added to print setting information DR-2 area shown in FIG. 9 and may print it.

In this case, in step Sc31 shown in FIG. 11, step Se31 in FIG. 14, and step Sg31 in FIG. 18, when a print sheet is fed out from sheet paper cassette 161 —, the thickness of the print sheet and the length toward the transportation direction are recognized. Then, it compares with the thickness and the length printed as print setting information DR-2 on interruption information page DR.

Here, the printing is suspended if the difference by comparison is recognized between the thickness and length in print setting information DR-2 and the thickness and the length in the paper. Then, future processes may be selected. This carries out as like Steps Se61—Se66 shown in FIG. 11, Steps Sc61—Sc66 in FIG. 14, or Steps Sg61—Sg66 in FIG. 18.

Figure 23:
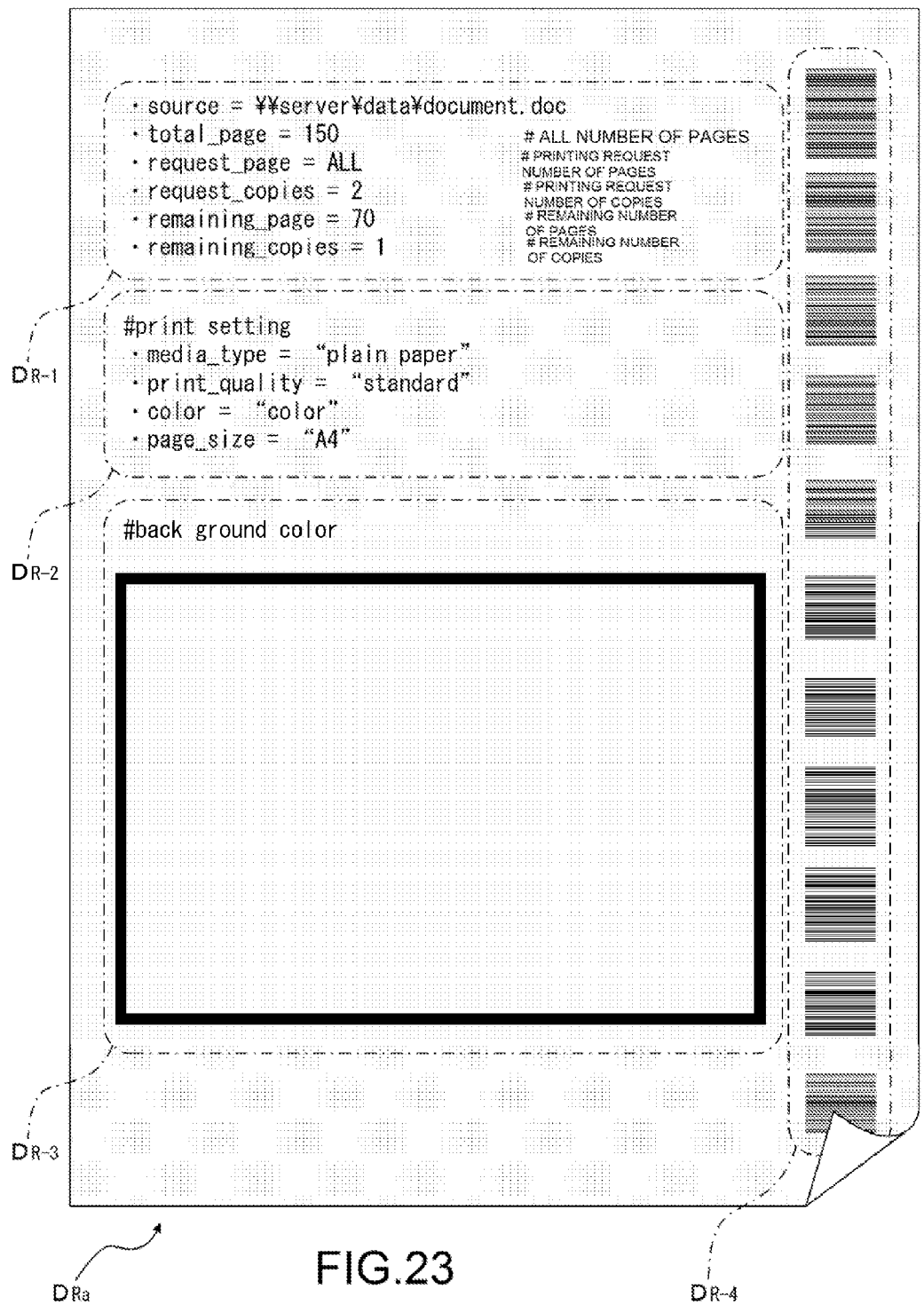
FIG. 23 is a figure showing a configuration of interruption information page DRa according to the other modification of the embodiment in the present disclosure.
Figure 24:
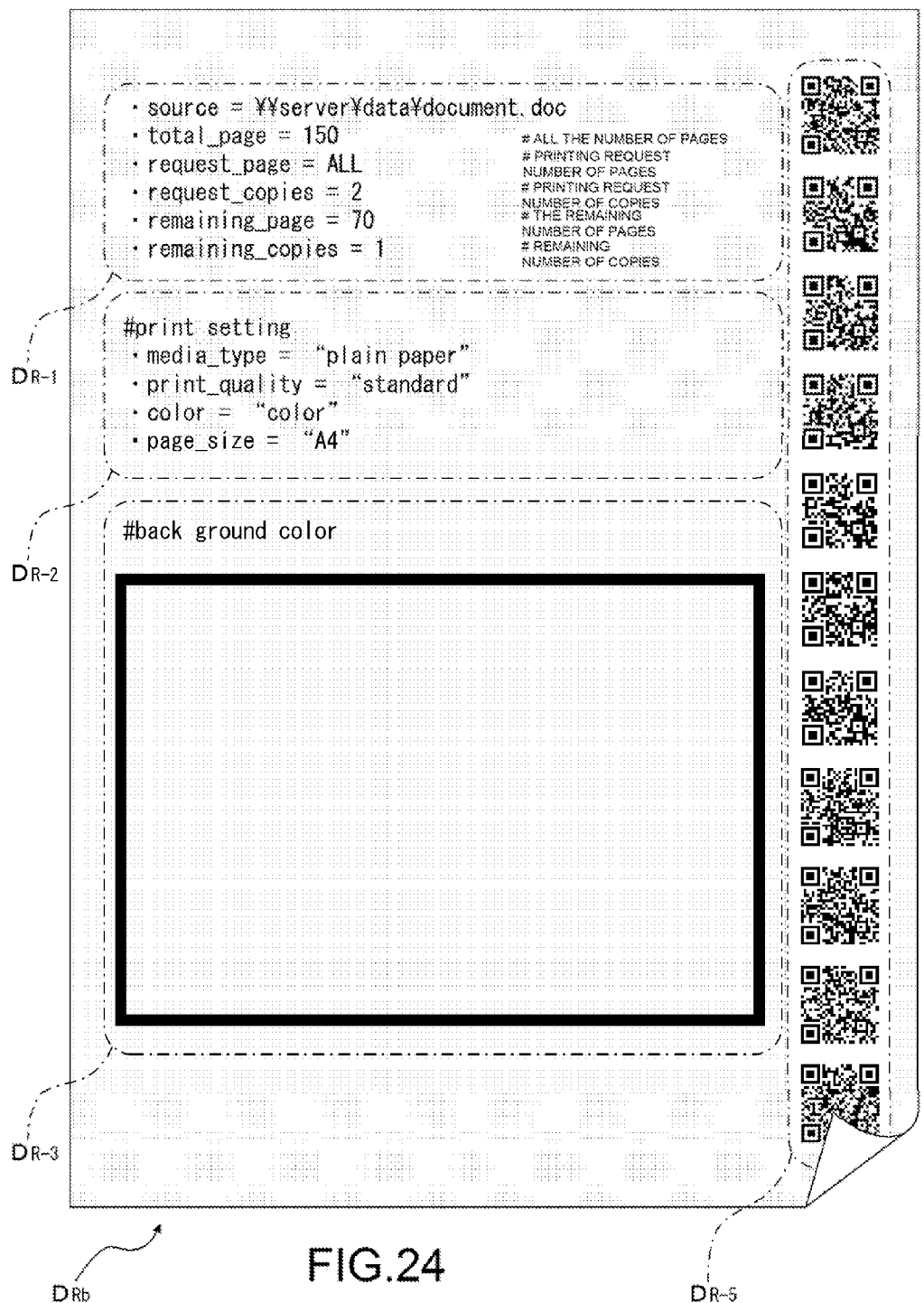
FIG. 24 is a figure showing the configuration of interruption information page DRb according to the other modification of the embodiment in the present disclosure.

Also, the other modification of the embodiment in the present disclosure is shown in FIG. 23 and FIG. 24. In interruption information page DRa shown in FIG. 23, print page information DR-1, print setting information DR-2, and background color frame DR-3 are provided. In addition, bar code DR-4 coded each information of print page information DR-1 and print setting information DR-2 is provided. Also, in interruption information page DRb shown in FIG. 24, print page information DR-1, print setting information DR-2, and background color frame DR-3 are provided. In addition, two dimensional code DR-5 coded each information on print page information DR-1 and print setting information DR-2 is provided.

For these bar code DR-4 and two dimensional code DR-5, the character string of print page information DR-1 area and the character string of print setting information DR-2 area is recognized by the character recognition program. Accordingly, the contents of interruption information page DRa or interruption information page DRb can be read in high precision.

As summarized, in the typical technology, after interrupting the printing process as mentioned above, in resuming the interrupted printing process, generally, the printing is resumed from immediately after the interrupted point of the page or number of copies. Then, in order to add the after-resuming documents to the already-printed the documents, it is necessary to store the information of the interrupted point of the printing process. With the typical apparatus, in the case that the information of the interrupted point of the printing process should be stored, burden of a user is reducible.

Incidentally, if it is going to switch over the printing process to other apparatus as mentioned above, that is, if it tries to succeed, the print sheet of the size used before interruption of this printing process is needed to be prepared for the switched over apparatus. However, many printers have function to perform printing even if it prepares only the print sheet having the size that is not correspond to the data inputted from the computer. Also, many printers have a function which expands or reduces size for adjusting with the currently-prepared print sheet. Therefore, when the printing process is resumed, the documents having not estimated size are mixed, and the printing process may be re-performed. Therefore, it makes not only a print sheet, a toner, and ink useless, but the time of printing becomes useless.

Such a problem may also happen in a case that the print sheet is filled up and a case that source of the sheet paper cassette and the paper tray of the print sheet are only changed, similarly. Therefore, in another typical apparatus, a printing error is prevented as if the sheet paper cassette and the paper tray are supplemented with the unsuitable print sheet.

However, in the above-mentioned print sheet, even if nominal size (standard size of A4 or B4, or the like) is the same, the specification of various paper quality may be present. Then, tone, or the like, may be changed by the specifications. Especially, in recycled paper, for example, even if the manufacturer is the same, feel of a material, tone, or the like, in the print sheet is changed with manufacture lots in many cases. Therefore, in the bundle of the documents that passed through above-mentioned interruption and resumption, quality of paper may change from the middle of that.

According to the present disclosure, when a printing process is interrupted, and when the printing process is resumed by supplement of the print sheet or is resumed by another apparatus, the effect is produced that it can prevent the paper of different paper quality is mixed in the bundle of the printed documents without it makes a print sheet useless.

In addition, it is a category of the present disclosure for an image forming apparatus combined some of the above-mentioned special features and for an electronic apparatus adapting the image forming apparatus that has each of above-mentioned special features, or the like.

What is claimed is:

1. A control method of image forming apparatuses that interrupts a printing process in a first image forming apparatus and resumes a printing process in a second image forming apparatus, comprising:
    a discontinuation step of recording interruption information including specification information of a print sheet at a time of the printing process being interrupted in the first image forming apparatus; and
    a resumption step of resuming the printing process in the second image forming apparatus based on the interruption information including the specification information of the print sheet, wherein
    the discontinuation step includes a step of printing the interruption information as an interruption information image in the first image forming apparatus, and
    the resumption step includes the steps of:
    receiving an input of print data to the second image forming apparatus,
    reading the interruption information in the interruption information image with the second image forming apparatus and storing in the second image forming apparatus, and
    resuming an interrupted printing process when the print data inputted to the second image forming apparatus is determined to be the print data corresponding to the interruption information.

2. The control method of the image forming apparatuses according to claim 1, wherein
    the interruption information is printed on a print sheet, wherein the print sheet on which the interruption information is printed is fed out from a sheet paper cassette that fed out the respective print sheet just before interruption of the printing process.

3. The control method of the image forming apparatuses according to claim 2, wherein
    the printed interruption information is formed by printing a background color frame for determining print page information, print setting information, and a ground color of the print sheet recorded on the interruption information.

4. The control method of the image forming apparatuses according to claim 3, wherein
    the print page information includes
    number of remaining print pages at the time of the printing interruption and remaining number of copies at the time of printing interruption.

5. The control method of the image forming apparatuses according to claim 3, wherein
    the print setting information includes
    a type and paper quality of the print sheet, ground color of the print sheet, and size of the print sheet used at the time of the printing interruption.

6. The control method of the image forming apparatuses according to claim 1, wherein
    the interruption information is stored in the first image forming apparatus and the second image forming apparatus in addition to a server connected with a network.

7. The control method of the image forming apparatuses according to claim 1, wherein
    the interruption information is stored in an external memory connected with the first image forming apparatus.

8. The control method of the image forming apparatuses according to claim 1, wherein
    the interruption information includes
    information for discriminating a ground color of the print sheet just before interruption of the printing process.

9. The control method of the image forming apparatuses according to claim 1, wherein
    in the second image forming apparatus, information about specification including color information of a print sheet contained in a sheet paper cassette is recorded on a paper information storage area in a memory part, and
    the resumption step includes the steps of:
    determining whether or not there is a print sheet having a same size and a same ground color as the print sheet recorded on the interruption information in the sheet paper cassette,
    selecting, when it is determined that the sheet paper cassette has the print sheet having the same size and the same ground color, the sheet paper cassette determined to have the print sheet having the same size and the same ground color, and
    resuming an interrupted printing process.

10. The control method of the image forming apparatuses according to claim 1, wherein
    a step of resuming the printing process in the second image forming apparatus based on the interruption information includes a step of:

reporting information by an informing part when a print sheet having a same size and a same ground color as the print sheet recorded on the interruption information is not contained in a sheet paper cassette in the second image forming apparatus.

11. The control method of the image forming apparatuses according to claim 1, wherein
a step of resuming the printing process in the second image forming apparatus based on the interruption information includes a step of:
waiting for a selection input of processing instruction for inputted print data when a print sheet having a same size and a same ground color of the print sheet recorded on the interruption information is not contained in a sheet paper cassette in the second image forming apparatus.

12. The control method of the image forming apparatuses according to claim 11, wherein
a step of waiting for the selection input of processing instruction for the inputted print data includes a step of:
starting formation of an image from a head page of the print data to a print sheet.

13. A control method of image forming apparatuses that interrupts a printing process in a first image forming apparatus and resumes a printing process in a second image forming apparatus, comprising:
a discontinuation step of recording interruption information including specification information of a print sheet at a time of the printing process being interrupted in the first image forming apparatus; and
a resumption step of resuming the printing process in the second image forming apparatus based on the interruption information including the specification information of the print sheet, wherein
a step of recording the interruption information when the printing process in the first image forming apparatus is interrupted includes the steps of:
printing the interruption information as an interruption information image in the first image forming apparatus,
reading the interruption information in the interruption information image with the first image forming apparatus, and
storing the interruption information in a server connected with a network; and
a step of resuming the printing process in the second image forming apparatus based on the interruption information includes
receiving an input of print data to the second image forming apparatus, and
a step of resuming an interrupted printing process when the print data inputted to the second image forming apparatus is determined to be a print data corresponding to the interruption information stored in the server.

14. A control method of image forming apparatuses that interrupts a printing process in a first image forming apparatus and resumes a printing process in a second image forming apparatus, comprising:
a discontinuation step of recording interruption information including specification information of a print sheet at a time of the printing process being interrupted in the first image forming apparatus; and
a resumption step of resuming the printing process in the second image forming apparatus based on the interruption information including the specification information of the print sheet,
wherein
a step of recording the interruption information when the printing process in the first image forming apparatus is interrupted includes the steps of:
printing the interruption information as an interruption information image in the first image forming apparatus,
reading interruption information in the interruption information image with the first image forming apparatus, and
storing the interruption information in external memory; and
a step of resuming the printing process in the second image forming apparatus based on the interruption information includes a step of:
receiving an input of print data to the second image forming apparatus, and
resuming an interrupted printing process when the print data inputted to the second image forming apparatus is determined to be a print data corresponding to the interruption information stored in the external memory.

* * * * *